US008332446B1

(12) United States Patent
Everest

(10) Patent No.: US 8,332,446 B1
(45) Date of Patent: Dec. 11, 2012

(54) SETUP OF PRECISE POLYNOMIAL EVALUATION BY UTILIZING A COMPRESSED ROOT PRODUCT FORM

(76) Inventor: Michael T. Everest, Sunnyvale, CA (US)

( * ) Notice: Subject to any disclaimer, the term of this patent is extended or adjusted under 35 U.S.C. 154(b) by 1033 days.

(21) Appl. No.: 12/271,663

(22) Filed: Nov. 14, 2008

(51) Int. Cl.
*G06F 7/38* (2006.01)
(52) U.S. Cl. ....................................... 708/203
(58) Field of Classification Search .................. None
See application file for complete search history.

(56) References Cited

U.S. PATENT DOCUMENTS

| | | | | |
|---|---|---|---|---|
| 7,076,061 B1* | 7/2006 | Lenstra et al. | ............... | 380/44 |
| 7,469,048 B2* | 12/2008 | Lauter et al. | ............... | 380/28 |
| 2005/0213758 A1* | 9/2005 | Lenstra et al. | ............... | 380/44 |

OTHER PUBLICATIONS

Higham, Nicholas J., "Accuracy and Stability of Numerical Algorithms" (1996) 136 pages.
Knuth, Donald E., "The Art of Computer Programming" (1999) vol. 2 Seminumerical Algorithms, Third Edition (1999) 41 pages.
Overton, Michael L., "Numerical Computing with IEEE Floating Point Arithmetic" (2001) 106 pages.
Priest, Douglas M., "Algorithms for Arbitrary Precision Floating Point Arithmetic" *IEEE Computer Society Press* (1991) 25 pages.
Shewchuk, Jonathan R., "Adaptive Precision Floating-Point Arithmetic and Fast Robust Geometric Predicates" *School of Computer Science* (1996) 57 pages.

* cited by examiner

*Primary Examiner* — David H Malzahn
(74) *Attorney, Agent, or Firm* — Hickman Palermo Truong Becker Bingham Wong LLP

(57) ABSTRACT

Based on the root-product polynomial form, this method compresses essential information of a polynomial by transforming polynomials into a form which eliminates cancellation error, when evaluating polynomials, of one unknown, for real, complex, and quaternion, which are implemented with floating point numbers. Additional filtering methods simplify evaluation, including the elimination of extremely small and large root factors, which can cause out-of-range errors. The usual setup problem for root-product forms, that of needing potentially unlimited root precision and floating point range, is largely eliminated for real polynomials, and greatly mitigated for complex and quaternion, and other hypercomplex polynomials.

14 Claims, 13 Drawing Sheets

Figure 1:
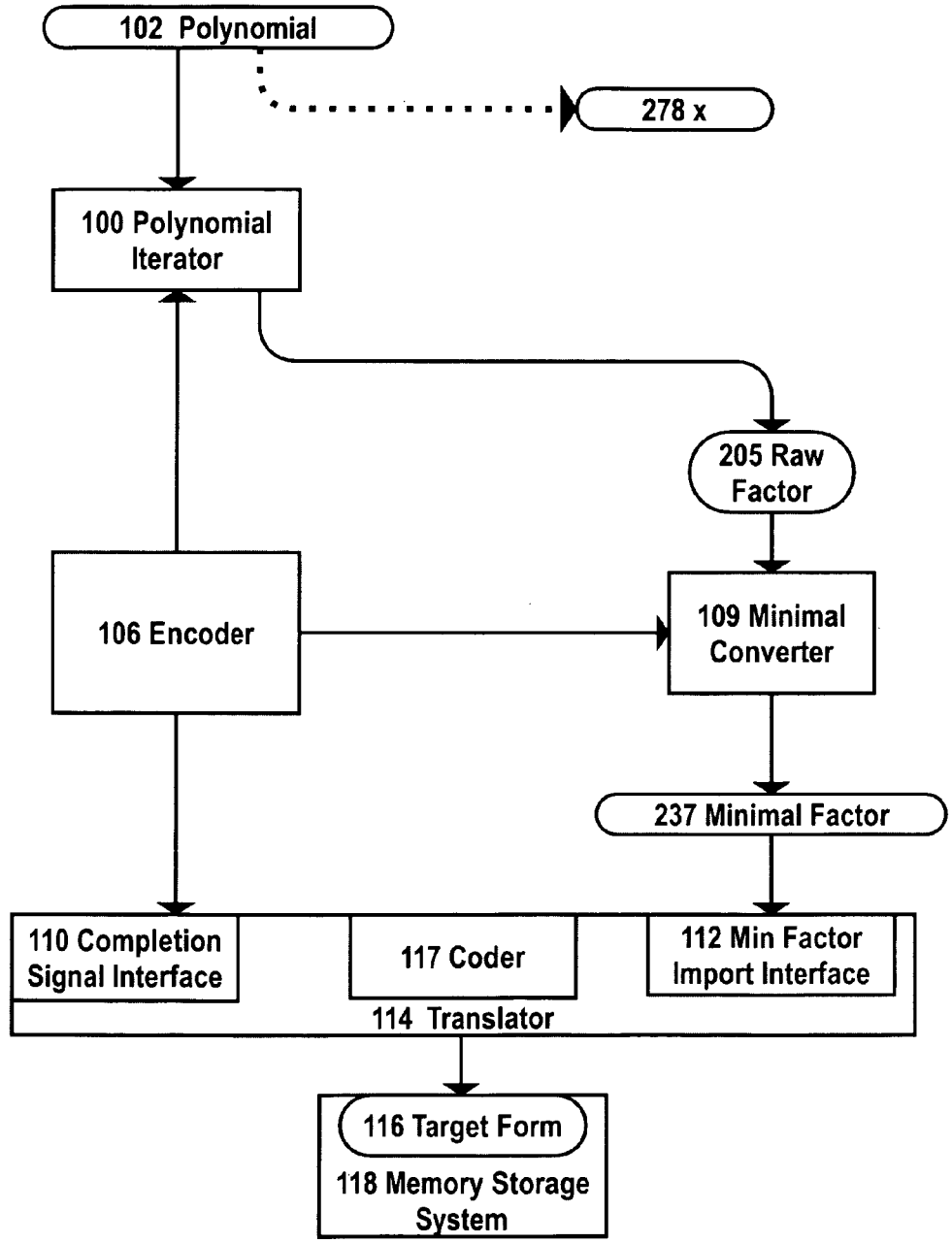

SETUP OF PRECISE POLYNOMIAL EVALUATION BY UTILIZING A COMPRESSED ROOT PRODUCT FORM

REFERENCES TO RELATED RESEARCH AND BOOKS

1. Book

"Accuracy and Stability of Numerical Algorithms", author Nicholas J. Higham, Copyright 1996, Published by the Society for Industrial and Applied Mathematics, 3600 University City Science Center, Philadelphia, Pa. 19104-2688. First five chapters are relevant to this discovery. Regarding root products, note question 5.5 on page 115, and answer on page 545. Regarding exact differencing of floating point values, see theorem 2.5 on page 50. See pages 78-79 regarding rounding errors for complex numbers.

2. University Research Paper

"Algorithms for Arbitrary Precision Floating Point Arithmetic", authored by Douglas M. Priest, Department of Mathematics, University of California, Berkeley, Mar. 19, 1991. Provides a general background and bibliography of techniques to extend floating point to multiple-precision floating point. This and the following paper helped inspire the two-step differencing, as used in this document.

3. University Research Paper

"Adaptive Precision Floating-Point Arithmetic and Fast Robust Geometric Predicates", by Jonathon Richard Skewchuk, May 17, 1996, School of Computer Science, Carnegie Mellon University, Pittsburgh, Pa. 15213. Extends the work of the Priest document, above.

4. Book

"The Art of Computer Programming, Volume 2, Seminumerical Algorithms", author Donald E. Knuth, Third Addition, Copyright 1998, Published by Addison Wesley, See sections 4.6.4 Evaluation of Polynomials, pages 485-524: discusses alternative methods of evaluating polynomials, but none guarantee precision.

5. Book

"Numerical Computing with IEEE Floating Point Arithmetic", author Michael L. Overton, Third Addition, Copyright 2001, Published by "siam", Society for Industrial and Applied Mathematics, Philadelphia. Provides background to IEEE standard for floating point and round-off error calculations.

BACKGROUND

1. Field of Invention

This invention relates to the preparation for efficient and precise evaluation of polynomial functions for numerical evaluation and analysis, and, particularly, polynomials evaluated with floating point, or similar, operations, in hardware or software, within a general purpose computer or numerical processor.

2. Discussion of Prior Art

The basic functionality embodied in differencing a real value and x, an exact floating point number, as in x±realValue is equivalent to the evaluation of a first degree primitive polynomial, as defined by (x−realRoot). Yet, the literature on polynomial evaluation does not show any way to consistently and quickly setup and perform a precise evaluation of the simple (x−realRoot) expression. This absence was the motivating factor to seek patent protection. By "precise", it is meant that the relative precision of the result reflects the number of bits of precision.

In addition to linear terms, as in (x−realRoot), a conjugate term, such as in $(x^2+c)$, is needed for efficient evaluation of polynomials using a root product form. Although, these forms require some refinement, they can be combined as a product of such factors.

The closest prior art is found in the Root Product form, described below, as item 4 in the section called Polynomial Approaches.

Basic Differencing Operation: x±rReal

Considerable literature exists on computing adds and subtracts with floating point operations, including multiple precision within floating point environments. The literature does not indicate any methods which work for all cases, other than the possibly unlimited increase in the precision of both the numeric representations and arithmetic operators, as needed, to provide the desired relative precision after massive cancellation of digits.

In traditional methods of differencing of an arbitrary real value and exact floating point input to produce a specific relative precision, there is no limit to the amount of precision required for the input real value. Problems arise whenever the real value approaches close to the exact input floating point value and thereby causes massive cancellation of significant digits.

Polynomial Approaches

Real polynomials can be expressed in many forms and each form has various methods of evaluation. Currently, there appears to be several commonly used methods: direct evaluation methods based on the polynomial specification; elegant and efficient methods which are fast but lack guaranteed precision for the general case; and brute force methods which attempt to produce a precise result using whatever computational resources are required. Current methods can be fast and can sometimes succeed with finite resources. However, these methods are sometimes inadequate for many applications and explains why polynomial processing is often avoided.

1. Direct Specification Approach

A polynomial can be evaluated based on its definition. For example, "3+2*x^1−5*x^2", can be directly evaluated for x. Indeed, the above expression can be input to a computer language compiler to produce computer instruction codes. However, these direct specification methods, even with exact numeric coefficients, do not always produce precise results, due to digit cancellation, when used directly with floating point processing.

2. Fast or Elegant Evaluation

Polynomials can be put into alternative forms that require fewer instructions. For example, use of Horner's Rule or the myriad methods in the Knuth reference [4]. Although faster, these methods are precise by accident. Because of their efficiency, and because they sometimes maintain adequate precision over a required input domain, they appear to be the mainstay of numeric processing on the computer.

3. Precise Brute Force Evaluators

For programs which must return a precise answer for an evaluation, such as a solution requirement for a specific number of correct significant digits, the simplest traditional approach is typically used: choose one of the above methods and iterate to a precise solution by raising the precision of the input and all internal expression evaluations until a sufficiently precise result is obtained as the final result. To avoid an apparent computational "freeze", the program sometimes has a method to detect when computer resources are insufficient or too much time has elapsed.

In addition to actual evaluation and resource checking, the program must, in some fashion, keep track of error intervals in order to determine successful completion of the iteration.

Whether using intervals or other means, these additional calculations can easily double the computation time.

4. Root Product Form:

The theoretical evaluation of a real polynomial in root-product form is well-known for a degree n polynomial with n number of roots. It consists of the product of the lead factor times terms consisting of (x–r) and terms consisting of ((x–r)^2+c).

Unlimited Precision Requirements

The above root products are simple to evaluate and lead to very simple and tight error bounds when the roots are exactly representable in the floating point form. (See the Higham book, page 115, exercise 5.5, and answers to exercises). However, on a computer, the subtraction of (x–root[i]), wherein the root is usually approximated, can easily suffer catastrophic digit cancellation, rendering an imprecise result. In order that the result of (x–r) be precise, the amount of precision required for the approximated root is theoretically unlimited.

Exponent Overflow and Underflow

Exponent overflow and underflow is another very serious problem with the root product form. The root parts of the polynomial may have exponent ranges which lie far outside the range of hardware floating point; this may occur even when the overall input domain and output values are well within the range of exponents. Extreme exponents for the roots also leads to intermediate values which are outside the range of allowed exponents.

OBJECTS AND ADVANTAGES

Comprehensive: All Finite Real Polynomials

The new evaluation method works consistently for all finite degree real polynomials. The setup is successful whenever both the approximate roots can be found, and the polynomial can be evaluated once for a few selected exact floating point values.

Extremely Tiny Results

A polynomial with a real root within the input domain, may have a result value which is arbitrarily small, and therefore out of the range of almost any hardware floating point. This new method detects all such numbers (there can never be more than the degree of the polynomial), and special case conditions can be used to return these special case values. Likewise, a conjugate pair of roots, with an extremely tiny imaginary part, can also exhibit the special case returns, and all such cases are also detected and processed by this method.

Limited Range of Factors

Consider the root factors of the root product evaluation. Each of the real factors must be evaluated. This means that all values within the factor must be computable. Consider the factor (x–r), where r is either extremely tiny or extremely large. How can such a factor be computed when even the constant "r" value is out of range? A similar problem exists for the conjugate pair processing or the leading constant. The answer is that such factors can be modified in a simple and consistent way without any affect on precision; however, the "catch" is that a considerable amount of pre-processing, performed just once, is required.

Floating Point Systems

The evaluation method works consistently for a wide variety of floating point systems, whether they incorporate correctly rounded results or not. The method works best on floating point systems incorporating a rounding which produces the exactly correct result when digit cancellation occurs, as is the case when two IEEE 754 double precision numbers are between a ½ and 2 multiple the other. Arbitrary precision systems may not offer such capability, but even here, the method can be modified to work.

Simpler Root Finding

The classical root product method of polynomial evaluation may require unlimited precision of the polynomial roots. This newly modified method places much simpler demands by limiting the required precision of the roots to just over two times the final working precision. This higher precision of the raw roots is only used during preprocessing.

Fast Evaluation

All evaluations of the final real polynomial form are fast because only a couple of floating point operations are required for each factor; all operations are at the same precision, which is the same as the final desired precision. Two thirds of the operations are adds or subtracts, and the remaining are multiplies. Similar results are assured for complex polynomials.

Precise Evaluation Every Time

With digit cancellation completely eliminated, only the equivalent of a few roundoff errors can occur for each degree of the polynomial. Worst case error is close to typical errors.

Guaranteed Concise Expression

The entire expression can be expressed as a leading factor, together with a small number of floating point operations for each degree of the final polynomial, where the final degree is less than or equal to the starting degree.

Generalizations

The entire methodology can be extended to complex, quaternion and other hypercomplex number systems, with nearly the same guarantee of precision and all the other advantages.

DRAWING FIGURE DESCRIPTIONS

All figures use rounded-corner rectangles to specify data objects and definitions; components, which process data objects, use rectangles. Dotted lines indicate implicit relationships, as described in the text.

FIG. 1. basic method for creating evaluations of polynomials.

Figure 2:
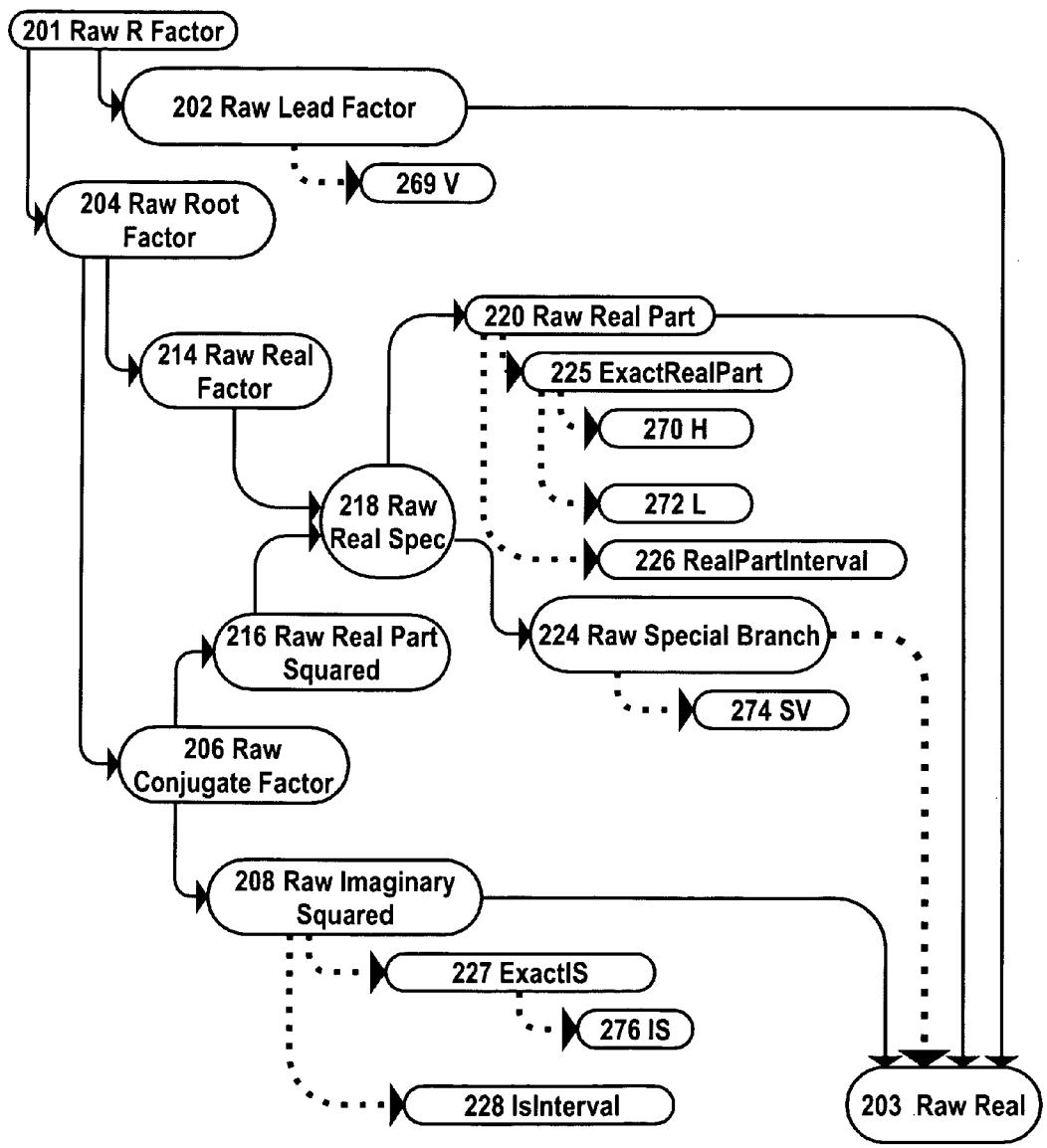

FIG. 2. raw root factor data for real polynomials.

Figure 3:
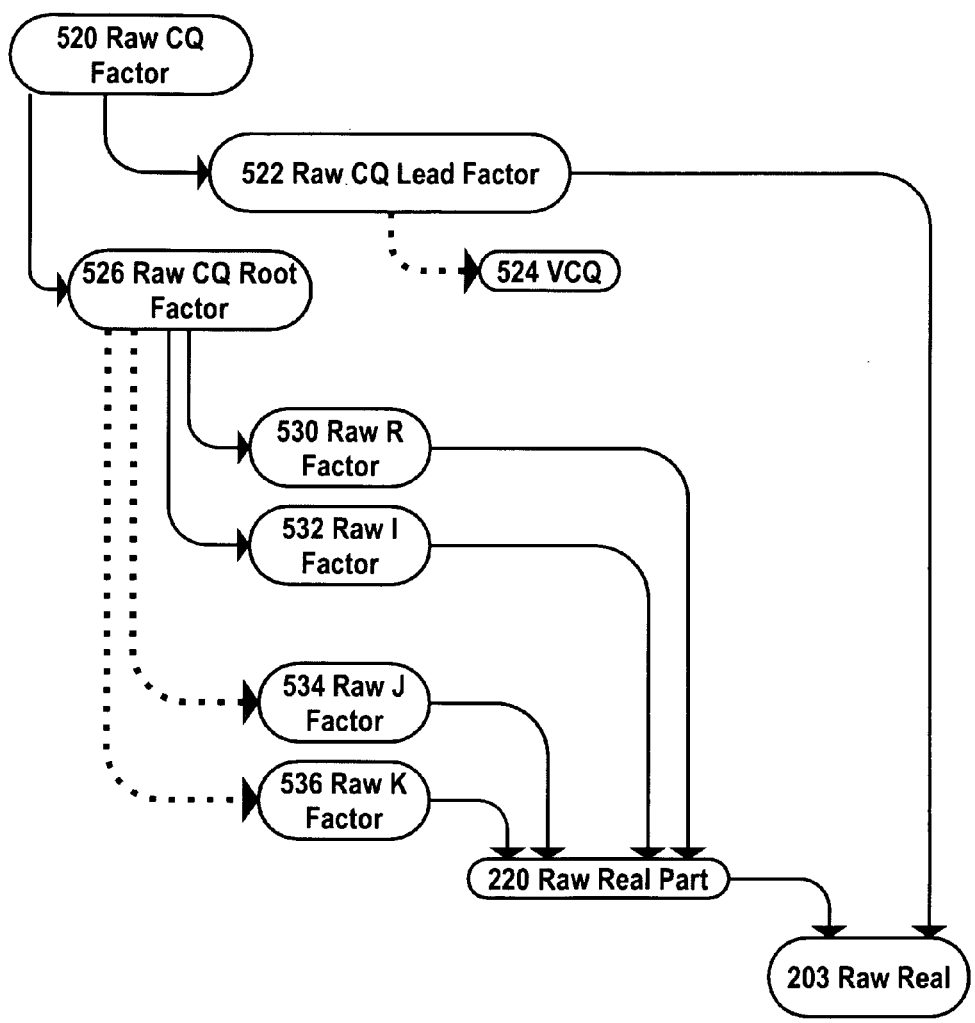

FIG. 3. raw root factor data for complex/quaternion polynomials.

Figure 4:
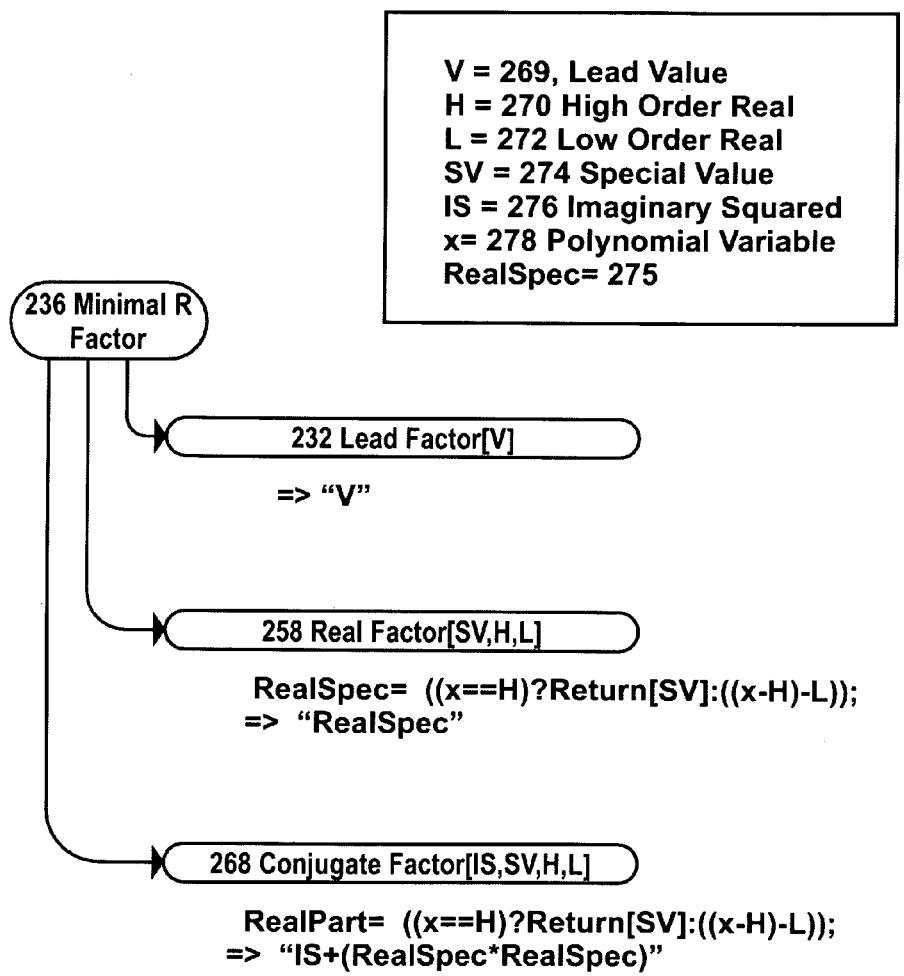

FIG. 4. minimal factor forms for real polynomials.

Figure 5:
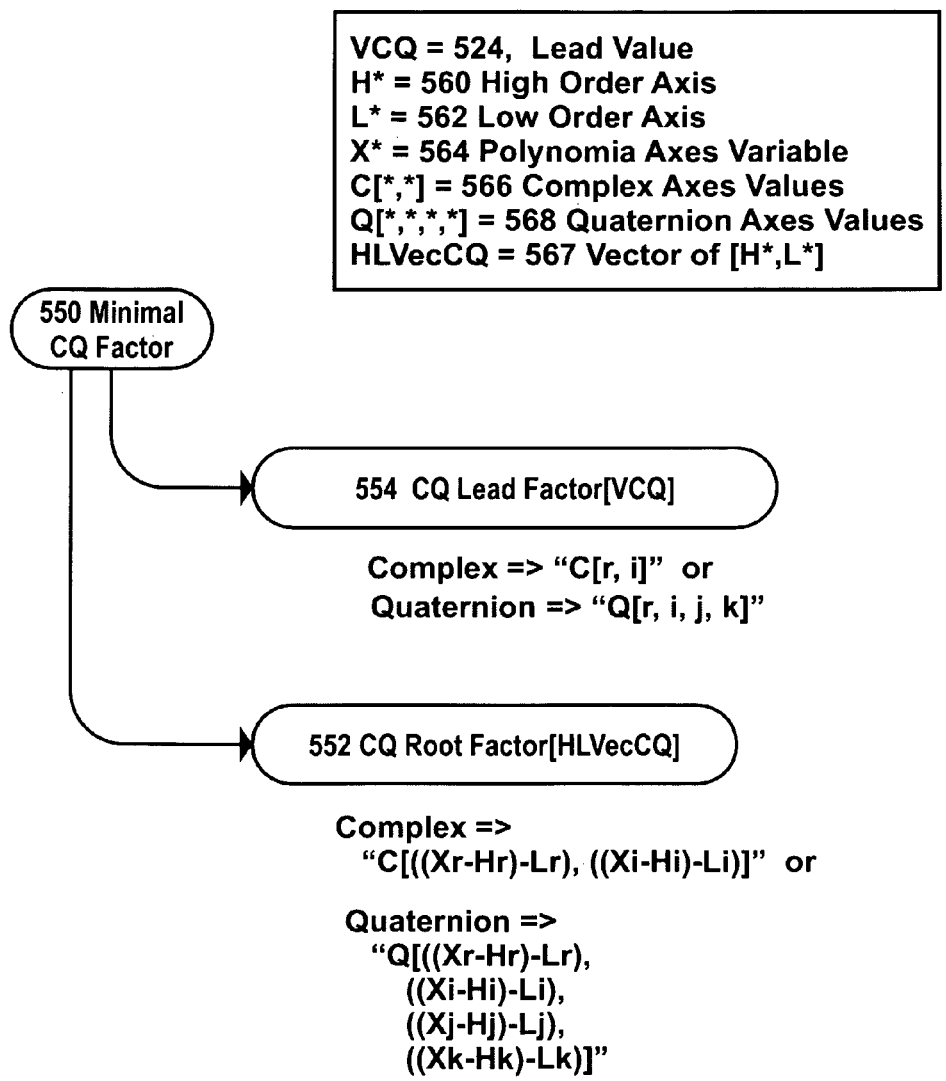

FIG. 5. minimal factor forms for complex/quaternion polynomials.

Figure 6:
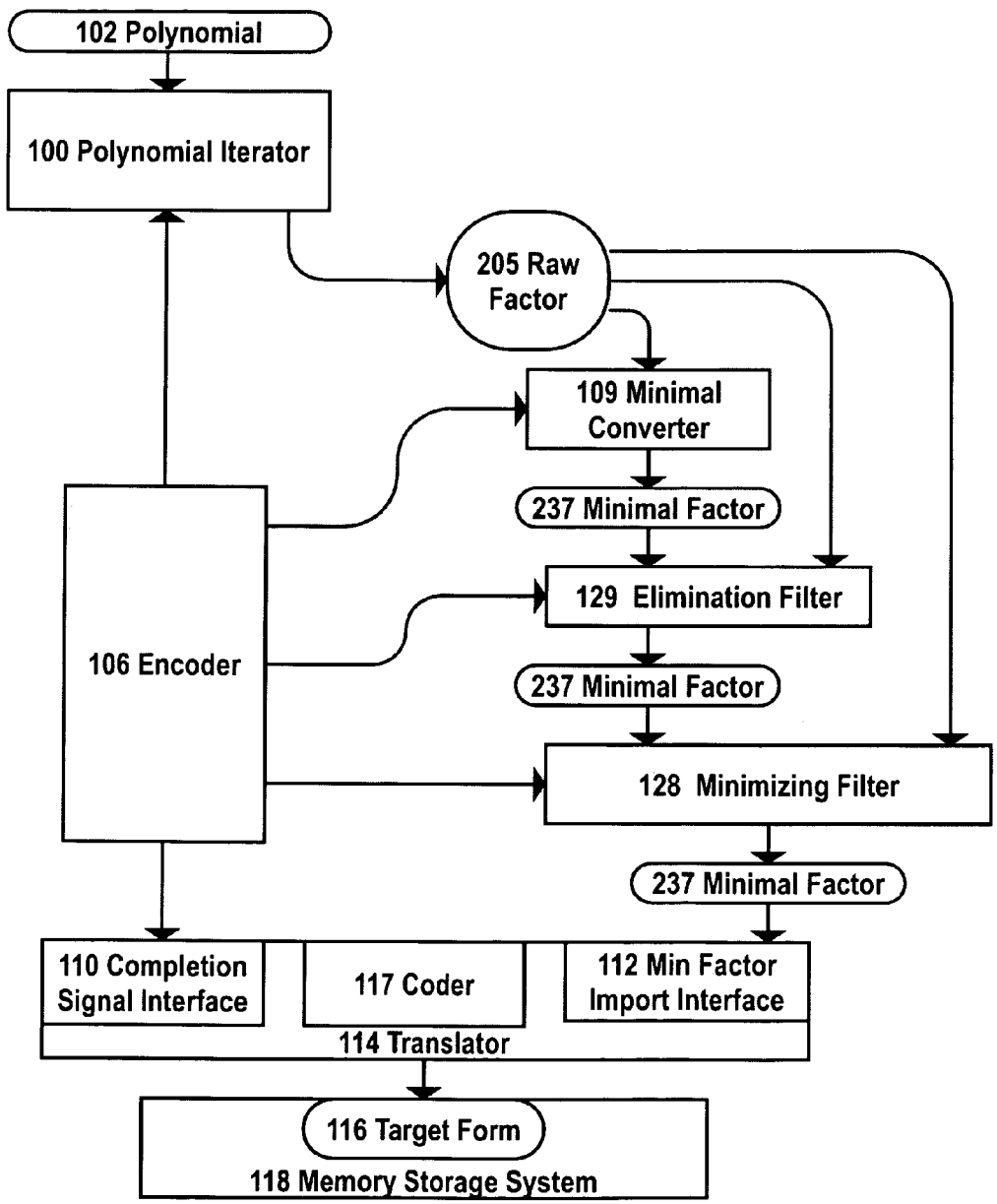

FIG. 6. optimizations of precise polynomial evaluations.

Figure 7:
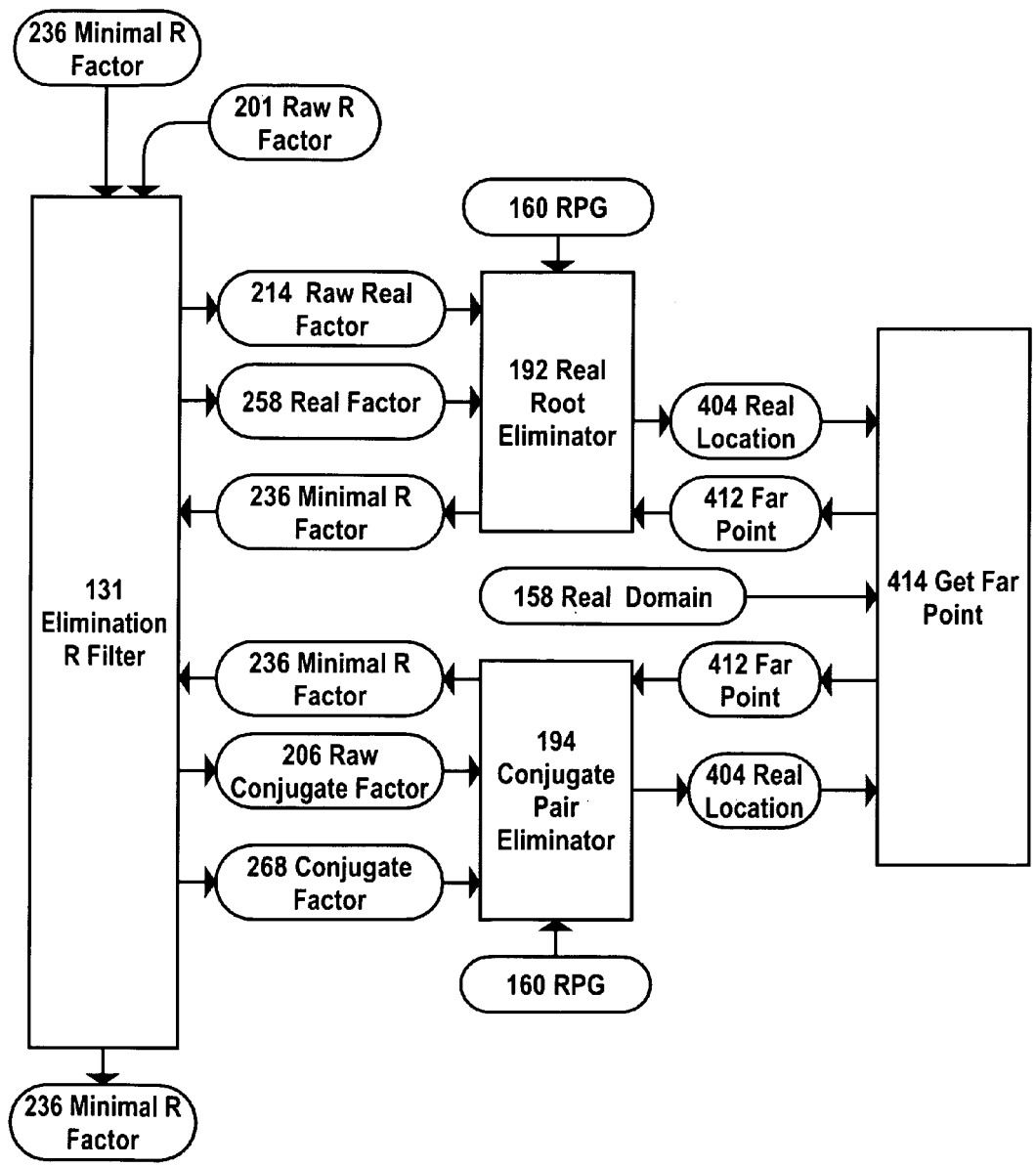

FIG. 7. a filter to eliminate root factors of real polynomials.

Figure 8:
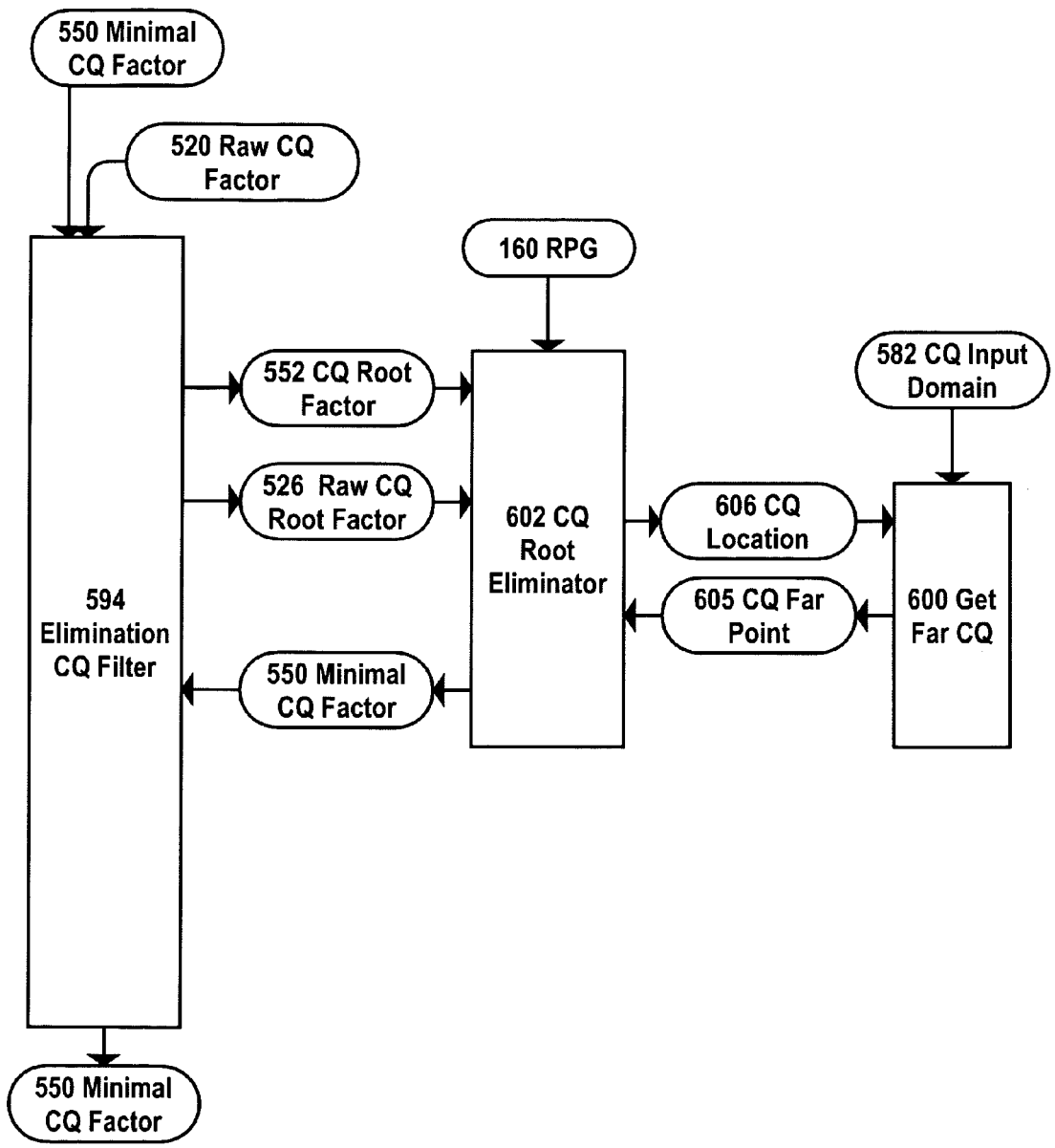

FIG. 8. elimination of factors of complex/quaternion polynomials.

Figure 9:
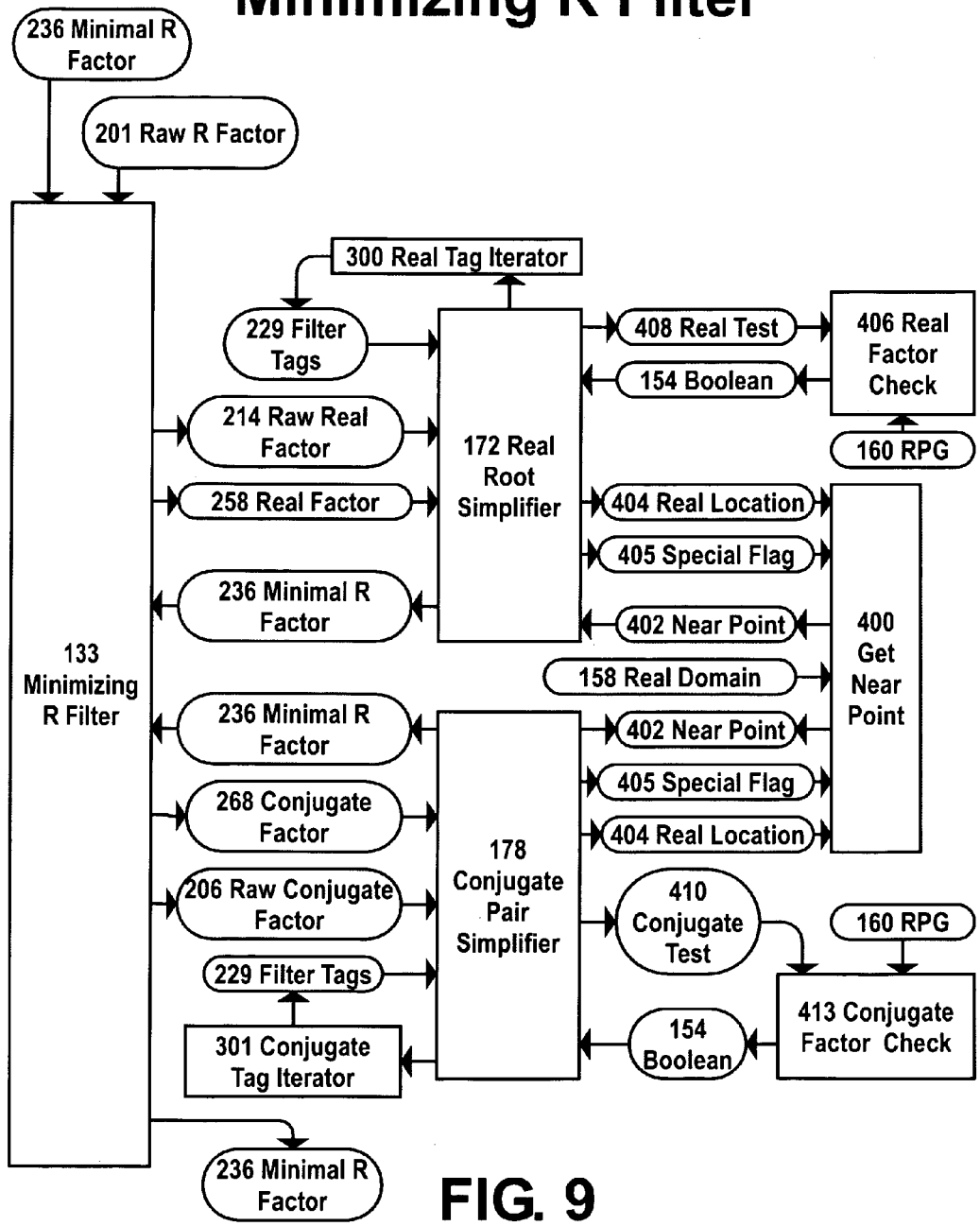

FIG. 9. simplifying root parts of real polynomials.

Figure 10:
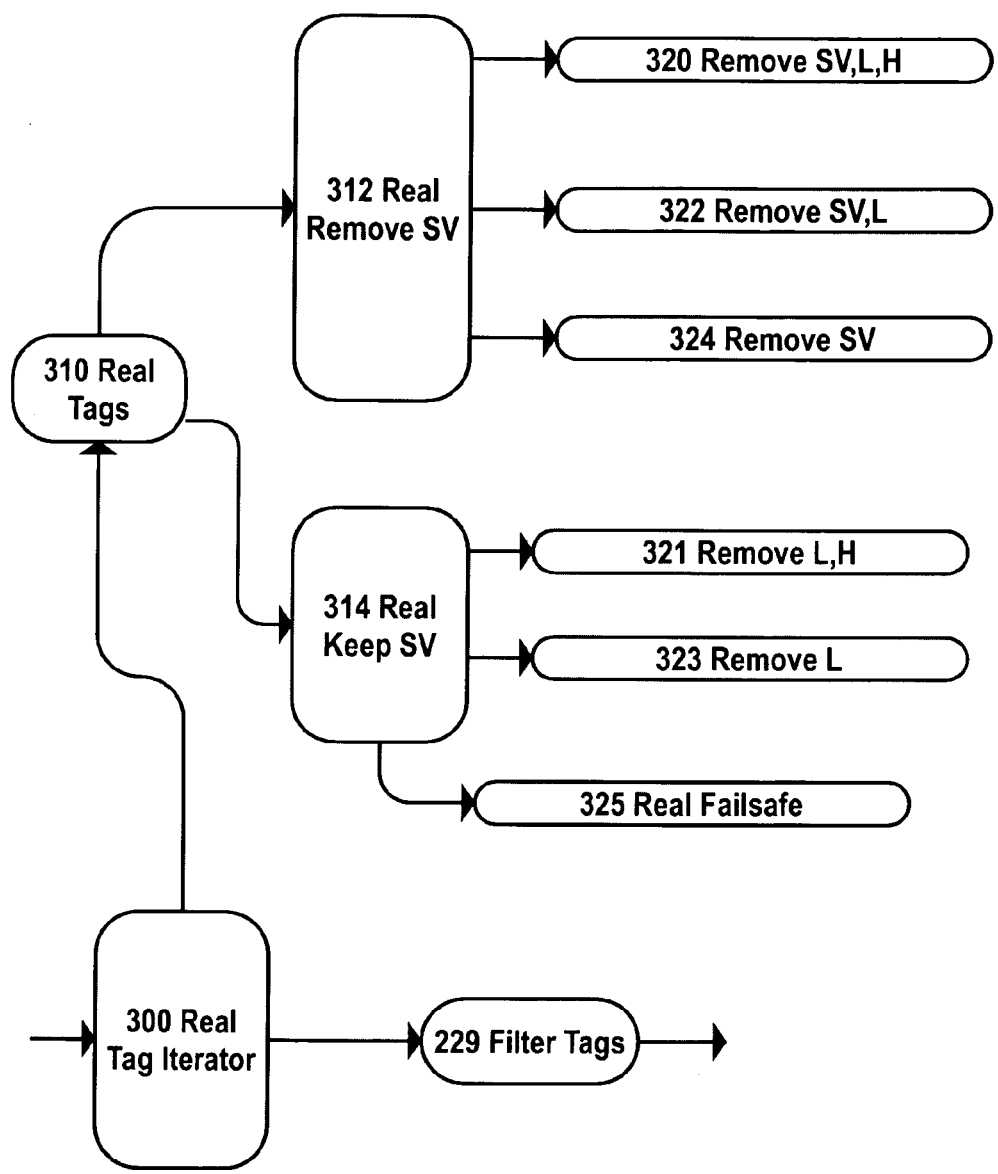

FIG. 10. priority table for simplifying real roots of real polynomials.

Figure 11:
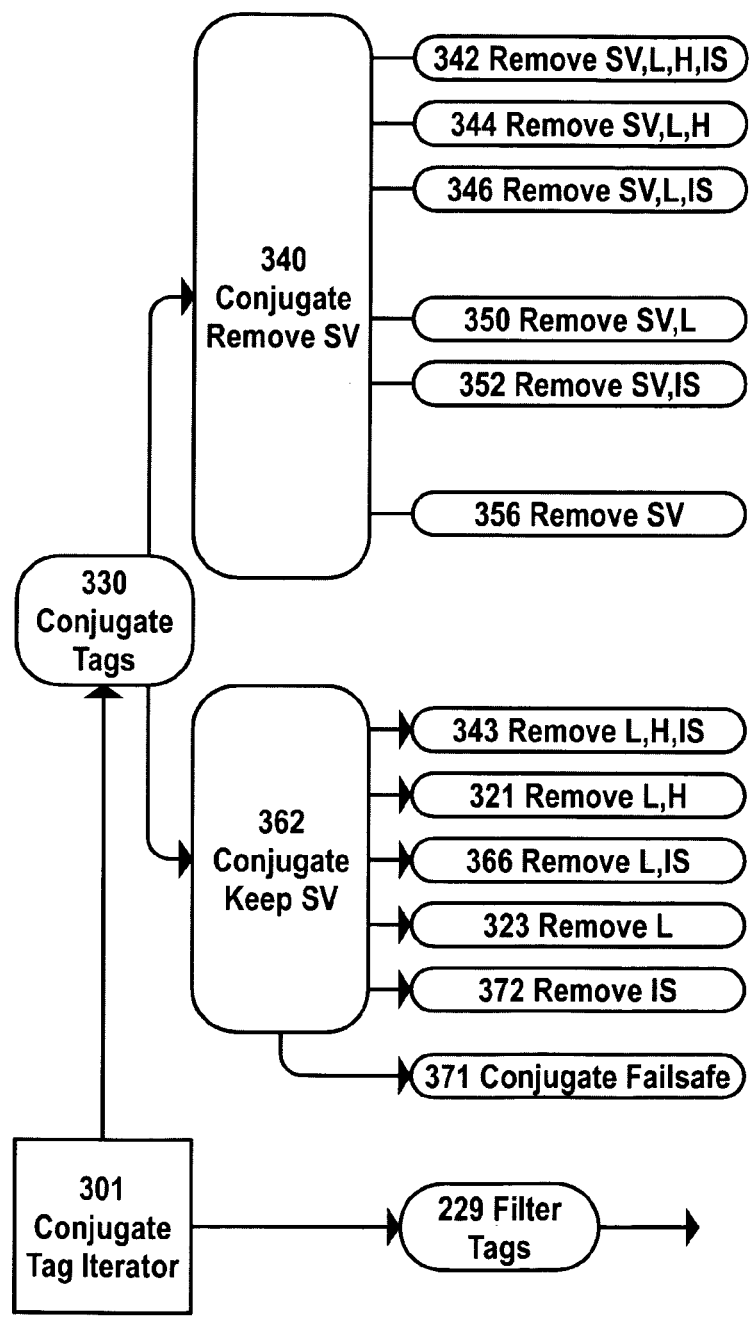

FIG. 11. simplifying conjugate pairs of real polynomials.

Figure 12:
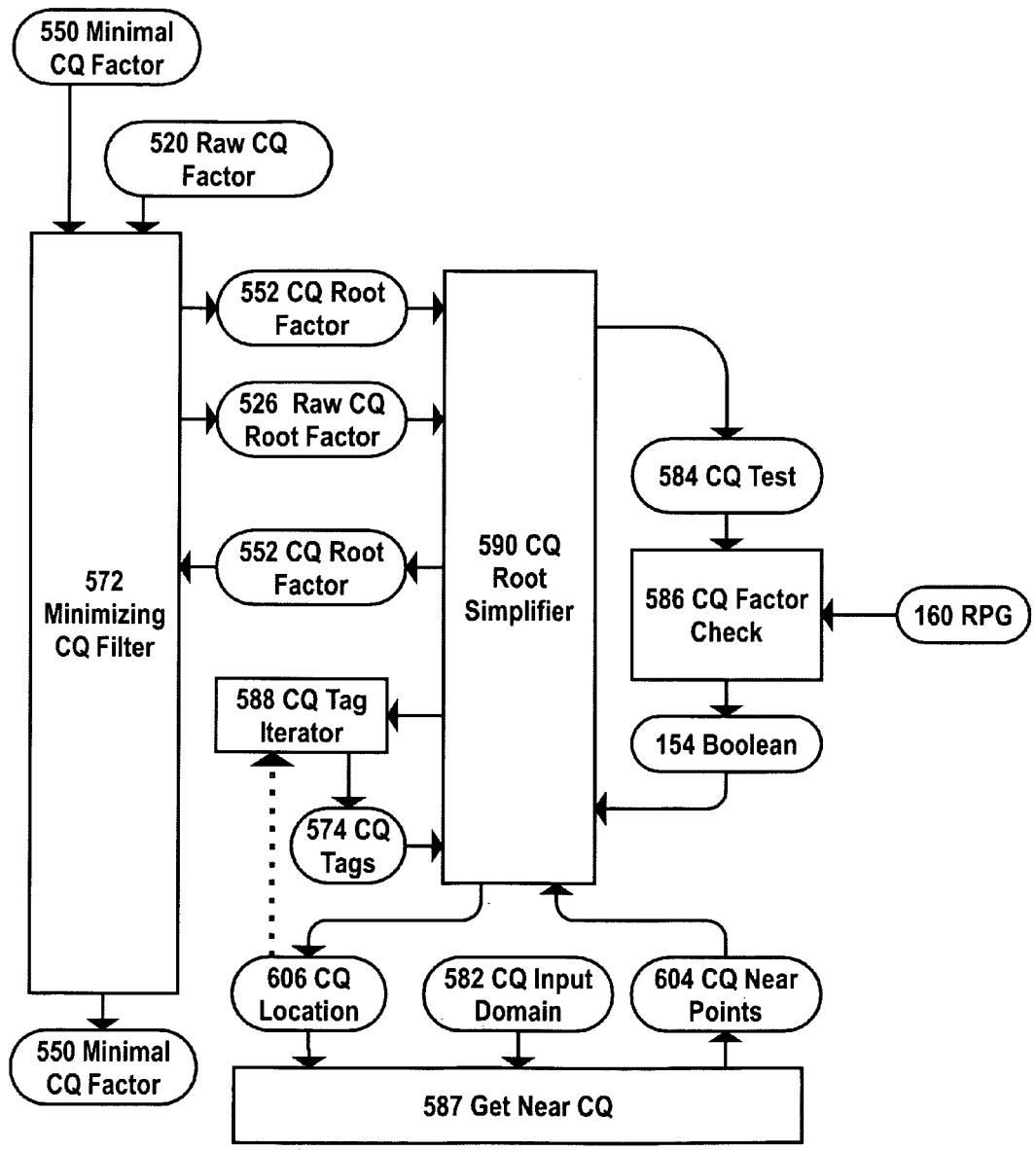

FIG. 12. simplifying root parts of complex/quaternion polynomials.

Figure 13:
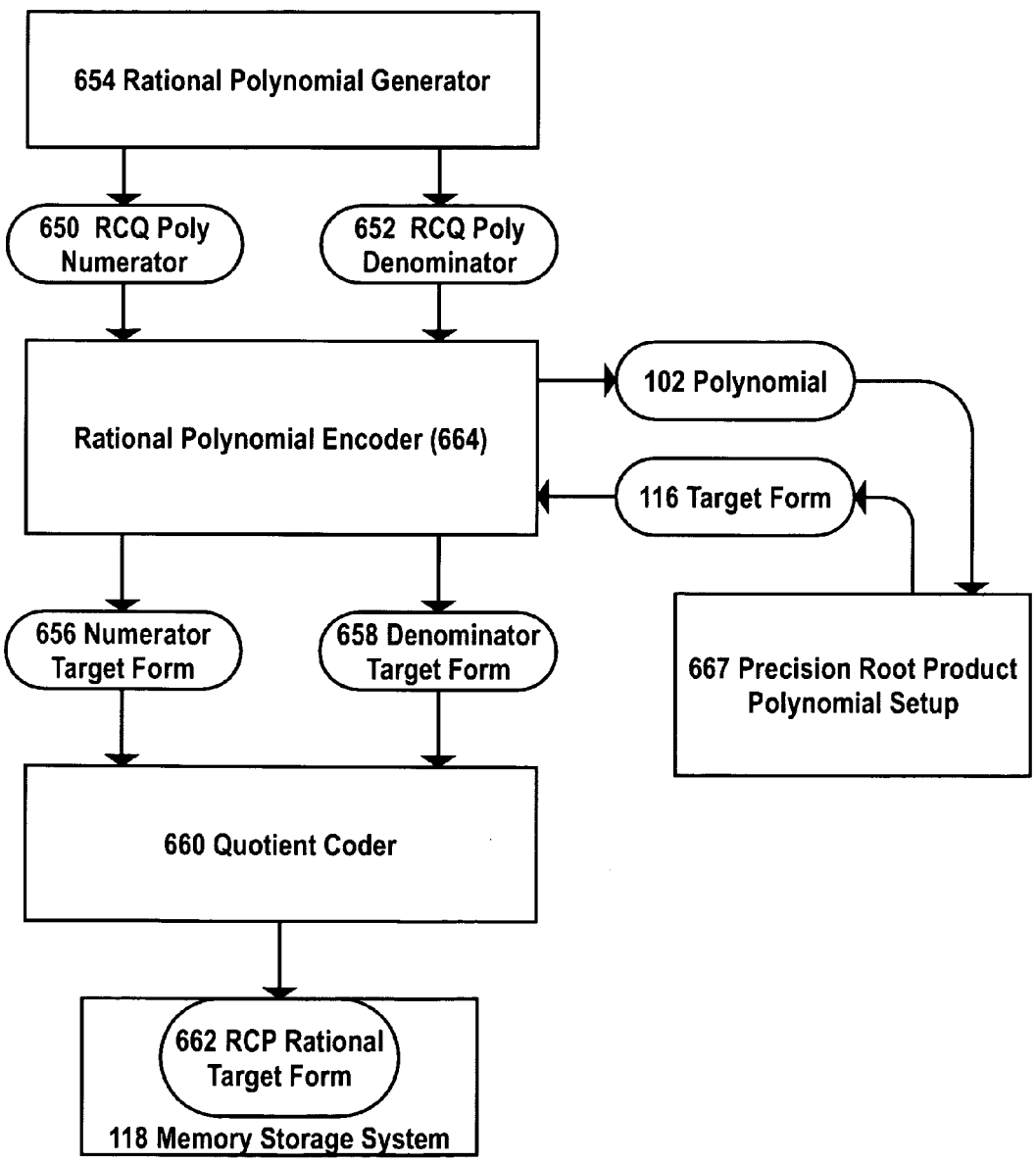

FIG. 13. application for using root product technology.

EMBODIMENT 1

Basic Method

FIG. 1 shows a basic method to transform a polynomial, Polynomial (102), into a root product form, called a Target Form (116), suitable for precise evaluation and processing, for any input domain consisting only of all floating point numbers, for real, complex and quaternion polynomials.

Overview

Any root product method has the property that as long as each root factor is computed in a way to preserve relative precision, then the final product will also evaluate precisely, because multiplying the values resulting from each root factor accumulates only roundoff errors, which preserves the relative precision of the entire product of factors.

Algorithm:

The raw roots of a polynomial are found, and first placed into compact form of factors, called Raw Factors (205). Each Raw Factor (205) is converted into a Minimal Factor (237), which stores only the required floating point information, and is then transformed into a final form, a Target Form (116) to meet the needs of its intended application.

Analysis:

For real polynomials, the tricky method of storing a high precision number using only two numbers of low precision is related to the use of a special conditional branch. In the case where the "double precision" number is inadequate to preserve precision, the special branch comes to the rescue. Amazingly, for all floating point numbers, for each root factor, there is only one possible input value which requires the use of the special branch; all other locations are evaluated by the "double precision" mechanism. The "double precision" mechanism is in quotes, because a full double precision operation is not required, and even this simplified double precision is only needed for adding and subtracting. A double precision multiply, a much more difficult problem, is never required.

For complex and quaternion polynomials, no guarantee of relative precision can be made for roots whose elements (e.g. real and imaginary parts) lie almost on exact floating point values (exact is okay); however, by using extra precision when finding the raw roots, the problem is greatly mitigated or eliminated, without affecting requirements for floating point precision or the number of floating point operation.

General Terminology

All special terms are capitalized to differentiate them from the text. Those terms which also appear in diagrams of any embodiment, whether components or data structures, are identified with a number in parenthesis after the name.

Constructor Environment

The Contructor Environment is a computer system environment, which supplies the raw processing power, together with some relatively simple, but high precision, numerical processing. Translation of the Polynomial (102) into a Target Form (116), is performed entirely within this Constructor Environment.

Target Environment

The Target Environment is the environment where the translated form is destined to be used. The Target Environment is assumed to have the ability to evaluate simple numeric expressions including correct rounding for adds and subtracts. Correct rounding means that the subtraction of two numbers produces an exact floating point result when they are within 1 binary order of (½ to twice) of each other; and otherwise there is only the equivalent of 1 rounding error; this is often the default in modern computer hardware. For systems without correct rounding, work-a-rounds can be made, such as using a very high precision subtraction in a single step. The Target Environment can be the same computer system as that of the Constructor Environment.

Target Number System

The Target Number System controls the potential quality of numeric operations. The Target Number System can be considered as a floating point number system. The number of mantissa bits within this target floating point number specifies an intrinsic precision goal. For example, the IEEE double precision floating point form uses 53 bits of precision. However, the Target Number System need not be defined in terms of available hardware floating point, because the target form (116) might be implemented in software.

Target Number

A Target Number is a number within the Target Number System, except that during processing in the Constructor Environment, the allowed exponent range is considered unlimited.

Target Precision

In all cases, the term Target Precision, is used to refer to the number of binary digits of the target environment's number system. For example, When IEEE double precision floating point is used as the Target Number System, the Target Precision is 53 (as in mantissa bits). Continuing with this example, If the description indicates that triple Target Precision is needed, then 3*53 or 159 bits of Target Precision are required.

Relative Precision

Relative Precision is a key concept used to measure the quality of numeric operations. Relative Precision specifies the quality of precision with respect to the true expected value. This is usually expressed as a positive number. For example, "Abs[TrueValue−ApproximateValue]/Abs [TrueValue]", where TrueValue is the theoretically correct value, ApproximateValue is the computed approximation and Abs[ . . . ] indicates the function of taking absolute value, as in determining the magnitude of a real number. Now consider the following example. Suppose the expected value is 20 but the computation produces 22; the Relative Precision is computed as Abs[(20−22)/20] which equals one tenth.

Root Absolute Precision, RootAbsError

Absolute precision measures the quality of numeric approximation as the absolute error, called RootAbsError in this document, between the approximate value and the true value. That is, the RootAbsError is the numerator of the relative precision expression.

For measuring RootAbsError for a real root, the error is the absolute value (that is the magnitude) of the difference between the true and approximate values. For measuring the RootAbsError for a complex root (which occurs as part of a conjugate pair, as well as in complex, quaternion, and hypercomplex numbers), the RootAbsError is equal to the Euclidean distance in the complex (or hypercomplex) plane between the true and approximate values. A fundamental ambiguity exists for the measurement of the true value. After all, most roots can only be found to a particular precision. Thus, the true value will need to be seen as a specific location with a surrounding error interval, as is done in this method.

For measuring RootAbsError in complex and quaternion roots, the same Euclidean distance is used. Of course, for quaternions, the distance is measured in 4-dimensional space.

Root Relative Precision, RootRelativeError

The Root Relative Precision, or RootRelativeError, is specified as the RootAbsError divided by the absolute value of the true value of the root. This division, by the true value, rules out a root equal to zero; all zero roots are expected to be exact. For complex roots, the absolute value is, of course, the square root of the sum of the squares of each of the real and imaginary parts. For quaternion roots, the square root is taken of the sum of the squares of all four dimensions. Similarly for other hypercomplex systems.

Round-Off versus Cancellation Errors

Numerists are always concerned with roundoff and cancellation errors.

Roundoff Errors

Roundoff errors occur when a number is rounded to the nearest value within a proscribed representation. These errors may occur during the setup process when numbers are rounded to specific floating point values. They also occur during evaluation when, say, multiplying two numbers together and then rounding to fit the result into a floating point number. Rounding errors are very small, usually about 1 part in $2^{(-m)}$, where m is the number of mantissa bits. Suppose, an entire polynomial operation has 100 such errors in an IEEE double precision operation. Although, this may seem like a large number of errors, it only causes, at the very worst case, a loss of about 7 bits of the entire 53 bits of target precision. In an actual computation, the law of large numbers, will cause many of the errors to offset each other, and the net result will be very close to full precision. In this document, the major goal is to keep the roundoff errors at a minimum, but without jumping-through-hoops to achieve the lowest possible number of such errors.

Cancellation Errors

Cancellation errors are much more serious and can lead to totally erroneous results through loss of all bits. This document describes methods which can completely eliminate cancellation errors while keeping roundoff errors at a minimum. For example, suppose we wish to compute (x−r), where both r and x are represented as Target Numbers, and "r" is an approximation of a real root. Further, suppose, for argument, that the Target Precision is just 4 bits of mantissa. Now x, representing an a floating point input number, is always exact. If its mantissa bits indicate binary "1001", as in the number 9, then that really means "1001.00000000000000 . . . ", with unlimited trailing zeroes. However, the "r" value is almost always an approximation. Suppose "r" rounds to a value of "1010.000000000 . . . ", an approximation called rApprox; and suppose the original bits, true bits, of r equal "1001.01bbbbbbbb . . . ", where all the trailing bits are indicated by "b", and where each b is 0 or 1, but cannot be determined. Now for (x−rApprox) within a computer with 4 bits of mantissa, we get a result of zero, exactly 0. But the real answer has no relative precision at all, because the mantissa bit pattern should be "0.01bbbbb", not an exact 0. Thus, cancellation error can be catastrophic and is always avoided. Using extra precision and computing (x−r) can yield something like "0.01 bbbbbbb", where only 2 bits of precision result, and the remaining bits are unknown and called "junk" bits. Processing junk bits takes time and resources and can give the false impression of useful results. The key purpose of this embodiment is the elimination of junk bits from the final result of each root factor.

C[r,i]

This form is used to represent the real, "r", and the imaginary, "i" parts of a complex number.

Q[r,i,j,k]

This form is to similarly represent a quaternion. Some books prefer to group the imaginary parts as in {i,j,k}, but this is not useful for our purposes.

Data Objects

The following data objects are important to the first embodiment, and are described first, before describing the components. You may wish to skip ahead to the component section, and return here after obtaining an overview of FIG. 1.

Polynomial (102)

See the top of FIG. 1. The polynomial may be real, or complex, or quaternion. The dotted line underneath the polynomial refers to the unknown variable for the polynomial, namely x (278), where this item may be real, complex, quaternion, or other hypercomplex number. All unknowns are to be filled with Target Numbers during evaluation.

Real Polynomial

A real polynomial is a real valued polynomial of one unknown, where the unknown is arbitrarily called x (182). For this embodiment, the value of x can be any floating point value. Consider, for example, "4*x^2+3*x+5" is a degree two real polynomial. However, a polynomial may be defined in many forms, including implicit or explicit forms. The only limiting factor of this method is that the polynomial must be capable of evaluation and have roots which can be found to a specified precision, and converted into root factors. "R" is sometimes used to indicate data for a real polynomial.

Complex/Quaternion

A polynomial may also be a complex (two element vector) or a quaternion value (a four element vector). The mnemonic "CQ" is used to refer to the complex and quaternion cases. "CQ" is sometimes used to indicate data for a complex/quaternion polynomial.

HyperComplex Number Systems

Higher order systems, generalizations of quaternion, include octonions and sedenions. The CQ system, just mentioned, can be used with these higher order systems as long as the product of factors preserves relative precision. Of course, several routines would need to accommodate the higher dimensions in the same simple manner in which complex numbers are generalized to quaternions. Higher order systems have additional restrictions, such as the loss of associativity of multiplication.

Raw Factor (205), FIG. 2, FIG. 3.

The Raw Factor (205), which appears several times in FIG. 1, represents any factor within a root-product form.

Example

Although the power terms, described above in the Real Polynomial (102), may be the most common form of a polynomial, another very useful form is the root product form, where a product of factors is based on the roots of the polynomial. For example, "2*x^3-4*x^2+4*x−8" can be represented as 2*(x−2)*(x^2+2), where 2, (x−2), and (x^2+2) are the underlying factors of the root product form. Such factors are called Raw Factors (205). A Raw Factor (205) is also used for complex or quaternion. The two following sections, together with FIG. 2 for real polynomials, and FIG. 3 for complex/quaternion, describe the types of Raw Factor (205);

Raw R Factor (201), FIG. 2

FIG. 2 shows the parts of roots needed to construct a Raw R Factor (206), which is the type of Raw Factor (205), always used when the Polynomial (102) is a real polynomial. The construction of these parts are all based on numbers within the Constructor Environment. The set of all Raw R Factors (206) of the Polynomial (102) represents the polynomial precisely for all floating point input values.

Raw Real (203)

See the bottom-right corner of FIG. 2. A Raw Real (203) can specify a high precision number, possibly very much higher than the Target Relative Precision.

Raw Lead Factor (202), and V (269)

A Raw Lead Factor (202) is encoded as a Raw Real (203) value with at least Target Precision. In FIG. 2, this object is found just below the Raw Factor (205). Recall the example of 2*(x−2)*(x^2+2). In this case, the value of "2" is the stored with at least Target Precision. The dotted line to V (269) indicates that the "V" value can be derived directly from the Raw Lead factor (202); to do this, round the value within the Raw Lead Factor (202) to Target Precision.

Raw Real Part (220), and ExactRealPart (225), H (270), L (272) RealPartInterval (226)

The Raw Real Part (220) is shown beneath, and to the right of, the V (269) in FIG. 2. A Raw Real Part (220) stores the value of the real part of a root in the form of a Raw Real (203). Recall the example of 2*(x−2)*(x^2+2). For (x−2), the Raw Real Part (220) is stored as "+2", not "−2" in a Raw Real (203). Beneath this data object in FIG. 2, dotted lines indicate some important values which can be derived directly or indirectly from the Raw Real Part (220). These are now described, and used frequently later in this document.

ExactRealPart (225)

The ExactRealPart (225) is the value of the Raw Real Part (220) interpreted as an exact value, with enough precision to fully represent the value.

H (270)

The H (270) value is found by rounding the ExactRealPart (225) to Target Precision. Rounding should always use Round-To-Even, which rounds a number, to the nearest Target Number, with a tie broken by rounding so that the low order bit is zero. This may result in zero, when ExactRealPart (225) is zero.

L (272)

The L (272) value is found by rounding the exact sum of (ExactRealPart-H). This may result in zero.

RealPartInterval (226)

RealPartInterval (226) is not referenced or needed in this embodiment, but is always implicitly present as a guarantee of sufficient precision. This object is an interval of real values, that specifies the range of values symmetrically surrounding ExactRealPart (225), such that the true value of the real part of the root lies within this interval. The ExactRealPart (225) is taken as the center of this interval. Refer to Raw Real Factor (214), below, for precision requirements for real roots. When this data specifies the real part of a conjugate pair, refer to the Raw Conjugate Factor (206), below.

Raw Special Branch (224), SV (271)

A Raw Special Branch (224), shown mid-right of FIG. 2, represents the rounded value, to Target Precision, obtained by evaluating the Polynomial (102) at a specific location. Because, the special value is not always needed, it may be sufficient to simply have a method to obtain the value of the polynomial at a specified floating point location; hence, the dotted line shown in FIG. 2. What is the location for evaluation? See the next item, Raw Real Spec (218). The exact value of this evaluation, after rounding to Target Precision, is called SV (275) and is shown in FIG. 2 as derived from the Raw Special Branch (224).

Raw Real Spec (218)

A Raw Real Spec (218) stores all the information about the part of a root which is real. This includes two items, the Raw Real Part (220) and the Raw Special Branch (224); both were described above. For any root referencing a Raw Real Spec (218), the location, for evaluation, for the Raw Special Branch (224), is the rounded value of the real part of the root, H (270), derived from the associated Raw Real Part (220), described above.

Raw Real Factor (214)

A Raw Real Factor (214) is simply a Raw Real Spec (218). The Raw Real Part (220) within the Raw Real Spec (218) should have a Relative Precision of at least 2 times the Target Precision plus 1 or 2 bits more. That is, the referenced RealPartInterval (226) must be "tight" enough that any value in the interval meets the relative precision goal. This data represents a real root factor; its meaning in terms of evaluation for any x, is described later. All roots must meet the precision requirement. The precision requirement is a guarantee, explicit or implicit, that the real root lies within a narrow interval, the RealPartInterval (226), described earlier.

Requirements for the RealPartInterval (226)

For example, if the Target Precision is 53, then the worst relative error, which is allowed, is set to about 2^(−((2*53)+2) and the worst absolute error is set to the worst relative error times the absolute value of ExactRealPart (225), described earlier. This value is called RootAbsError, and was also mentioned earlier. Then, the RealPartInterval (226) ranges through all values from (ExactRealPart-RootAbsError) through (ExactRealPart+RootAbsError). Although this is straightforward to calculate, some mathematical systems might return root values as this interval, in which case no computation is required. Remember, in this embodiment, the actual interval is only a guarantee, and does not need to be explicitly calculated, but all this discussion is useful in understanding the meaning of that guarantee, and later embodiments.

Raw Real Part Squared (216)

This data references the Raw Real Spec (218) to provide the real part of a complex root. As part of a conjugate pair, the real factor (x−r) is always squared; hence the name includes "Squared". Referencing this data allows direct access to the underlying real parts referenced by the Raw Real Spec (218).

Raw Imaginary Squared (208), IS (276), ExactIS (227), ISInterval (228)

This data contains the constant term for a conjugate pair. The required precision is never more than the Target Precision, and may, in fact, be less! Refer to the Raw Conjugate Factor (206), described later. The additional values which can be derived are detailed below, and are indicated in FIG. 2 as dotted lines from this data. If "imag" is the imaginary part of a root of a conjugate pair, then the Raw Imaginary Squared (208) specifies "imag^2", which is the square of the imaginary part. Here are derived values.

ExactIS (227)

The ExactIS (227) value is simply the Raw Imaginary Squared (208) value, interpreted as an exact number.

IS (276)

The IS (276) value is found by rounding the ExactIS (227) to Target Precision.

ISInterval (228)

ISInterval (228) is not referenced or needed in this embodiment, but is always implicitly present as a guarantee of sufficient precision. The ISInterval (228) specifies a range of real values symmetrically surrounding the ExactIS (227). That is, the "true value", as interpreted from the roots of the polynomial, for the imaginary squared value, is within the ISInterval (228), with ExactIS (227) at the center of this ISInterval (228). Refer to the Raw Conjugate Factor (206), below, for requirements and construction.

Raw Conjugate Factor (206)

This data defines a conjugate pair by referencing a Raw Real Part Squared (216) and the Raw Imaginary Squared (208).

Overall Precision Requirements.

The underlying precision of each root in a conjugate pair must have a relative precision, based on Euclidean error in position relative to the origin, of at least just over twice the Target Precision, where a few extra bits of precision above the twice Target Precision, might eliminate one or two round-off errors.

RootAbsError and RootRelativeError Guarantees

Recall the description of RootAbsError and RootRelativeError, as described earlier under General Terminology. The overall precision requires that intervals of RealPartInterval (226) and ISInterval (228) are "tight" enough to define the location of the true value of the root within the overall precision guarantee. Although these values are an implicit guarantee and are not used in this embodiment, the calculation of these intervals is useful in understanding the guarantee. Also, these values will be needed in the descriptions of other embodiments. The tightness of the intervals for the real part of the root and the imaginary are the same, because they are both based on the same RootAbsError.

Requirements for the RealPartInterval (226) for Raw Real Part (220)

Let "ERP" be the exact value specified by ExactRealPart (225), of the underlying RawRealPart (220) for a Raw Conjugate Factor (206). The RealPartInterval (226) is defined by all values between (ERP−RootAbsError) to (ERP+RootAbsError).

Requirements for the ISInterval (228) for Raw Imaginary Squared (208)

Let "EIP" be the exact square root value of ExactIS (227) of the underlying Raw Imaginary Squared (208) for a Raw Conjugate Factor (206). Thus, the EIP is the original magnitude of the imaginary part of the conjugate pair. Let "ImagInterval" be defined by all values between (EIP−RootAbsError) to (Exact+RootAbsError). Thus, ImagInterval, must hold the true value of the imaginary part of a conjugate pair. This interval may contain zero, which would indicate ambiguity in knowing if the conjugate pair is a true conjugate pair or simply two real roots. Now, we are ready to define ISInterval (228) as the square of the "ImagInterval". This is done using standard interval arithmetic. If you are unfamiliar with this technology, then please refer to a later embodiment, which has a section describing interval arithmetic.

Raw Root Factor (204)

This data specifies a root factor of either the Raw Conjugate Factor (206) or a Raw Real Factor (214).

Raw Factor (205), References

This data specifies any factor by referencing either the Raw Lead Factor (202) or the Raw Root Factor (204).

Raw CQ Factor (205), FIG. 3

FIG. 3 shows the parts of roots needed to construct a Raw CQ Factor (520), which is the type of Raw Factor (205), always used when the Polynomial (102) is a complex, quaternion or hypercomplex. FIG. 3 shows the data structure necessary to store a raw factor, either a leading factor or root factor. Notice that FIG. 3 is much simpler than FIG. 2. There are two reasons. First, the Raw CQ Factor (205) cannot use a special value branch, as seen in the Raw Special Branch (224) of FIG. 2. The second reason, is that there is only one type of root factor in FIG. 3, namely the Raw CQ Root Factor (526); in the case of FIG. 2 for real valued polynomials, two types of root factors were required, a Raw Real Factor (214) and a Raw Conjugate Factor (206). About ½ of the data items in FIG. 3 are taken directly from the data items in FIG. 2. Only, the new items are described.

Raw CQ Lead Factor (522), VCQ (524)

A Raw CQ Lead Factor (522) of FIG. 3 is analogous to a Raw Lead Factor (202) of FIG. 2. Unlike the Raw Lead Factor (202) which is a single constant, a Raw CQ Lead Factor (522) needs either 2 or 4 values, depending upon whether the polynomial is complex or quaternion. Thus, it represents either a complex or quaternion constant. The values are encoded as Raw Reals (203) with at least Target Precision. In FIG. 3, a Raw CQ Lead Factor (522) is found just below the Raw CQ Factor (520). The dotted line from a Raw CQ Lead Factor (522) to VCQ (524) is analogous to the dotted line to V (269) in FIG. 2. In this case, the VCQ (524) represents the 2 or 4 values when rounded to Target Precision. The dotted line, in this case, means that the item can be easily derived from the data stored in the Raw Real (203).

Raw CQ Root Factor (526) and Raw*Factor (530), (532), (534)(536)

A Raw CQ Root Factor (526) specifies either 2 or 4 sub-factors, depending upon whether it is complex or quaternion, respectively. The four items hanging from the Raw CQ Root Factor (526), beginning with Raw R Factor (530) are simply pointers to the previously described Raw Real Part (220). Each of these sub-factors become part of a vector to define the complex or quaternion root value.

Precision Requirements, Issues

The raw root vector (complex or quaternion) should have at least enough precision to position the root, to over 2 times the target precision by at least 2 bits; that is, 2*P+2, where P is the Target Precision. However, this may not be enough. Unlike the earlier embodiments for real polynomials, there is no special branch value to ensure that the result is precise.

Example

Suppose, the true complex root is equal to C[2+2^−80,2^−80], and suppose that C[2,0] is part of the complex input domain, the Target Precision is 10, and we obtain a Euclidean precision of 30 for the root factors. Thus, the CApproxRoot, the approximate root is returned as CAppoxRoot[2,0]. To evaluate this factor at Cinput[2,0], we obtain CApproxRoot [2,0]−Cinput[2,0]=>Cresult[0,0]. Clearly, this result has no precision because the true result should be Ctrue[2^−80,2^−80]. If we up the root approximation to 100 bits of precision, then we would obtain the correct result. Similar problems result with quaternions.

Zero "Rounding" D

When the precision of the roots are insufficient to ensure precise of the evaluation of a raw cq root factor (526), the precision of the roots can be increased, so that that the raw cq root factor (526) is sufficiently precise. However, some roots will require extreme precision, perhaps too much, and therefore the result of a root factor may be imprecise. However, such an imprecise root factor will evaluate to an extremely small absolute value, which will cause the entire polynomial to evaluate to an extremely small value. In many applications, treating all very small values as zero is okay. Insufficient precision can be detected, as described in later embodiments.

Minimal Factor (237), FIG. 4, FIG. 5

The Minimal Factor (205) appears several times in FIG. 1, and is described in terms of a real polynomial (next) in FIG. 4, and for complex and quaternion polynomials (later) in FIG. 5. A Minimal Factor (237) contains all the information necessary to preserve the relative precision inherent in the previously described Raw Factor (205). All data is stored in a couple of floating point values, of Target Precision, but with unconstrained bounds on the floating point exponent. That is, even if the original Raw Factor (205) is calculated to thousands of digits, the information in a Minimal Factor (237) for even small Target Precision, of say 5 bits, all the necessary information is preserved. Thus a Minimal Factor (237) can represent extreme compression of relevant data. However, later embodiments, can filter the data into even smaller amounts, sometimes. The two next major sections describe the Minimal Factor (237) for real and then complex/quaternion systems.

Notation

Each of the detailed Minimal Factors (237), described below, include a bracketed list of names for floating point values.

Minimal R Factor (236) of FIG. 4

FIG. 4 shows the structure of a Minimal R Factor (236) data object, and its three forms. Minimal R Factors (236) are used only for real polynomials. These forms are used to directly encode data from a Raw Factor (205) into an exact definition utilizing floating point terms. Regardless of the size and precision of the root parts in any Raw Factor (205), the data is packed into no more than four floating point values of the Target Number System.

Internal Data Objects.

All numeric values are stored as numbers in the target number system.

All numbers are exact floating point values. All of these values are shown in box in the upper-right of FIG. 4.

V (269), or Lead Value

Refer to the Raw Lead Factor (202) for derivation of the V (269), a Target Number.

H (270), L (272), High and Low Order

The H (270) and L (272) values store numbers of the Target Number System. Their construction was described in the earlier description of Raw Real Part (220). Here is an example. Suppose the value of the Raw Real Part (220) is given by a binary bit pattern of "110100000011100111" and the target number system is only 4 bits of mantissa. If we look only at the mantissa bits for the encoded H (270) and L (272), the result would be H (270) equals "1101" and L (272) equals "1110", where L (272) has a much smaller exponent than H (272). Notice that it doesn't matter how many zero bits occur between the first group of bits, H, and the last group of bits, L. For this embodiment, and for the case of 4 bits of mantissa, only 10 bits of raw bit pattern is actually needed; the bit pattern would be "1101000000". In this case, notice that the L (272) value is zero.

SV (274), or Special Value

The SV (274), a Target Number, was described earlier under the description of the Raw Special Branch (224), in the section "Raw R Factor (201), FIG. 2."

IS (276), Imaginary Squared

See the earlier description of Raw Imaginary Squared (208) for this Target Number, in the section "Raw R Factor (201), FIG. 2."

x (278), Polynomial Variable

This value represents the variable in the original polynomial. It is used only to describe the coding sequence, where it can take on a floating point value.

RealSpec (275), ((x==H)?Return[SV]:((x−H)−L));

This value represents the mathematical meaning of the result of processing the Raw Real Spec (218) as part of any Raw Root Factor (204). If the value of x, the input value, equals the H (270) value, then immediately return the SV (274) value. Otherwise compute ((x−H)−L). Note that this "Meaning" is merely an intention, and the actual translation into code needs only to preserve this intent.

Processing SV Returns

An implementation can choose to process all SV returns, from conditional branches, from all factors, before actually processing any other parts of factor evaluation.

Critical Processing

Clearly, if implemented as described, it is critical that this operation is performed in the order given, and not according to some mathematical rules. For example, ((x−H)−L) is mathematically equivalent to (x−(H+L)), but the results may be completely different. In general, the processing of (x−H) is the most critical; the best results require that (x−H) is computed with round-to-even rounding, wherein when the value to round is exactly between two floating point target values, then choose the value which produces a low order zero bit. This is probably the default hardware rounding on most machines. Other "correct rounding" techniques may work. Fortunately, this type of rounding is typically the default in modern computers, and is also easy to implement in software. Refer to the prior art.

Why it Works for Real Roots

Here is the meaning again: ((x==H)?Return[SV]:((x−H)−L)). Notice, that in this method, full cancellation begins when the x value approaches the H value. As it gets within one order of magnitude, (for IEEE double precision or any other using correct rounding), then correct rounding eliminates all rounding errors to produce a floating point result with no errors. As the value of x approaches to the nearest floating point values above and below the value of H, the result of (x−H) remains exact, and equal to the least significant bit of H. This leading bit plus L, no matter what it is, provides enough precision to ensure that the results of ((x−H)−L) has full Target Precision. However, When x exactly equals H, the result is equal to −L. If −L is full precision, then the result will have Target Precision. However, if the original L value has some "junk" bits due to inadequate precision of the original Raw Factor (205), then ((x−H)−L) is not good enough. But wait, at that critical moment, the special branch is utilized, and the full high precision value for the entire polynomial is returned. This description explains why the method works similarly for conjugate pair processing. However, remember that in a conjugate pair, the real part may contain a lot of junk bits, but this only happens when the imaginary part of the root is very large and swamps any error resulting from the real part of the root.

Three Forms

Just as the Raw R Factor (201) is based on three factors, the Minimal R Factor (236) has three forms, in one-to-one correspondence. The conversions of individual parts of a Raw Factor (205) into internal data objects was just described. The "meaning", in the evaluation of the polynomial, is shown in FIG. 4, which shows typical coding sequences which perform the evaluation of an individual factor. Each polynomial is defined as a product of these factors; and the product of these factors, whether Raw R Factors (201) or Minimal R Factor (236), preserves the Target Precision during evaluation. For each item, the required Target Numbers are identified. All operations can be interpreted or directly performed using adds, subtracts, and multiplies within the Target Number System, subject to out-of-range exponents.

Lead Factor [V] (232)

The Min Lead Factor (232), derived from the Raw Lead Factor (202), requires one Target Number, V, which was described, above. The single value, as shown in FIG. 3, is encoded as a constant.

Real Factor [SV,H,L] (258)

The Real Factor[SV,H,L] (258), derived from the Raw Real Factor (214), of FIG. 2, or its equivalent Raw Real Spec (218), and requires three target numbers: SV, H, and L, which were described above. In FIG. 3, a typical C-language coding is used to show how a value can be computed for this factor, as soon as the value of x (278) is known. See RealSpec (275), above, for details.

Conjugate Factor[IS,SV,H,L] (268)

This form uses SV, H, and L values to compute the value of RealSpec (275) from the Raw Real Spec (218). This may result in an immediate return of an SV value whenever the x input equals the H value. If there is no immediate return of SV, then set the result equal to the sum of IS (276) plus the square of the RealSpec (275), just computed. The IS (276) parameter is derived from Raw Imaginary Squared (208), as described earlier. Note the critical interpretation of the RealSpec (275) may involve strict ordering of floating point operations, as described in the description of the RealSpec (275).

Minimal CQ Factor (550), FIG. 5

FIG. 5 shows the Minimal CQ Factor (550), which is analogous to the Minimal R Factor (236) of FIG. 4. FIG. 5 is simpler than FIG. 4, because for the complex and quaternion cases, only two types of factors are required. FIG. 5 shows the simple mathematical meaning for the construction of these factors.

15

Internal Data Objects.

All numeric values are stored as numbers in the Target Number System. All numbers are exact floating point values. All of these values are shown in box in the upper-right of FIG. 5.

VCQ (524), or Lead Value

Refer to the Raw CQ Lead Factor (522) for derivation of the VCQ (524), a vector of Target Numbers.

H*(560), L*(562), High and Low Order

These values are the same as the H (270) and L (272) values described in previous embodiments, but here, "*", can take on a one of "r", "i", "j", "k", to represent an axis in the complex or quaternion plane.

X* (564), Polynomial Unknown

For complex numbers, a polynomial takes two variables, Xr and Xi, for the real and imaginary axes. For quaternions, a polynomial takes four variables of: Xr, Xi, Xj, and Xk.

C[*,*] (566), Complex, Real and Imaginary Parts.

See the earlier description in the General Terminology of this embodiment.

Q[*,*,*,*] (568), Quaternion, Real and 3 Imaginary Parts.

See the earlier description in the General Terminology of this embodiment.

HLVecCQ (569), Vector of H* and L* Words

This vector contains elements with paired H* and L* Target Numbers.

For complex, this vector has two entries for a total of 4 Target Numbers. For quaternions, the vector has four entries for a total of 8 Target Numbers. These values are extracted from the corresponding entries for a Raw CQ Root Factor (526) in FIG. 12. For example, for complex, the Raw CQ Root Factor (526) has two entries, a Raw R Factor (530) and a Raw I Factor (532), where both of these have appropriate H and L entries which are used in the HLVecCQ (569).

Forms for Minimal CQ Factor (550)

The Minimal CQ Factor (550) has two forms, which are derived from the two forms of Raw CQ Factor (520) of FIG. 3. The conversions of individual parts of a Raw CQ Factor (550) into internal data objects was just described. The "meaning" of a Minimal CQ Factor (550), in the evaluation of the polynomial, is now described in terms of typical coding sequences which perform the evaluation of an individual factor. Each polynomial is defined as a product of these factors; and the product of these factors, whether Raw CQ Factors (520) or Minimal CQ Factor (550), preserves the Target Precision during evaluation. For each item, the required Target Numbers are identified. All operations can be interpreted or directly performed using adds, subtracts, and multiplies within the Target Number System, subject to out-of-range exponents.

CQ Lead Factor [VCQ] (554)

The CQ Lead Factor[VCQ] (554) of FIG. 5, derived from the Raw CQ Lead Factor (522) of FIG. 3, requires a vector of Target Numbers, VCQ (523), which was described, above. The single vector, as shown in FIG. 5, is encoded as a vector of constants, either complex or quaternion.

CQ Root Factor [HLVecCQ] (552)

The CQ Root Factor [HLVecCQ] (552), derived from the Raw CQ Root Factor (526), requires the HLVecCQ (567), described above in the section for "Internal Data Objects". In FIG. 5, a typical C-language coding is used to show how a value can be computed for this factor, as soon as the value of X* (564) is known.

Components

With the above basic terminology and data objects, the components for Basic Method, are now described.

16

Memory Storage System (118)

Return to FIG. 1, and find the Memory Storage System (118) at the bottom. Once the Target Form (116) is generated, it is preserved in the Memory Storage System (118) for later use in the Target Environment.

Translator (114)

The Translator (114) is found in FIG. 1, near the bottom, and just above the Memory Storage System (118). The Translator (114) provides a Min Factor Import Interface (112) for accepting incoming Minimal Factors (237). The Translator (114) also provides a Completion Signal Interface (110), which when activated by an external component, forces the completion of the generation of the Target Form (116) within the Memory Storage System (118); this signal also makes the Translator (114) ready to receive input generated from another Polynomial (102). The process of building the Target Form (116) is performed by a Coder (117), shown within the Translator (114). The Coder (117) must prepare a Target Form (116) that is suitable for the intended target application within the Target Environment where evaluation will occur. This process may be simple, and involve nothing more than Tranferring the Minimal Factors (237) into the Memory Storage System (118).

Coders

The following types of Coders (117) are examples of typical useful applications.

Direct Coder

If the intended purpose of the Target Form (116) is to simply preserve the list of Minimal Factors (237), then these can be directly stored into the Target Form (116) within the Memory Storage System (118). As each Minimal Factor (237) is received through the Min Factor Import Interface (112), it is placed into the Memory Storage System (118) for later use in evaluations. The compact form provides all the key data to precisely evaluate the Polynomial (102).

Expression Coder

The Expression Coder takes each received Minimal Factor (237) and creates an arithmetic expression and stores it into the Target Form (116). FIG. 4 and FIG. 5 gave examples for encoding individual Minimal Factors (237).

Example of Real Expression Coding

The following example shows a typical result of receiving a Leading Factor (232), a Real Factor[SV,H,L] (258) and a Conjugate Factor[IS,SV,H,L] (268).

$$2*(x-24)*(((x-5)-2-80)2+4)$$

The parenthesis for individual factors are usually critical. As exact values, ((x−5)−2 −80) is the same as (x−5−2 −80). However, clearly, the step-by-step process enforced by parenthesis is critical for rounding operations when hardware floating point is used for the Target Precision. This Target Form (116) is the source code to evaluate the Real Polynomial (102) precisely at any floating point location of the Target Number System. The expression result can be used as a human readable form for a precise evaluation.

Coding CQ Arithmetic

As with the real case, for complex and quaternion coding, multiplication is required to form the product of factors. Arithmetic for complex and quaternion operations is in the common literature, but a brief description is provided at the end of this embodiment.

As shown in FIG. 5, the coding of individual factors is simpler than for the real case. Multiplication of one factor by another, however, is non-commutative for quaternions, and therefore, for quaternions, switching the ordering of products is generally not possible.

Custom Coder

A custom coder produces code for computer execution. For example, it may be a two step process to produce a source file, a compilation of the source into a object file, followed by linking into a program or adding the code as a plug-in to another already running application. If the expression coder described earlier is output to a computer language compilation, then it could be considered a custom coder.

Reducing Rounding Error for ((x−H)−L)

For ever-so-slight improvement to rounding errors, several techniques are available.

Combining Words

When formatting a particular Minimal Factor (237), the double word action of ((x−H)−L) may be saved or implemented as (x−(H+L), if the entire H+L bit pattern can be stored in a long mantissa, which will slightly reduce rounding errors during an evaluation. The advantage of keeping them separate is that much less space might be required, such as when the H+L bit pattern is very wide. For example, H=2, and L+2^−100, requires over a hundred bits of mantissa. Also, suppose the Target Precision is chosen as 12, which after round-off errors when evaluating the entire polynomial, may achieve 8 bits of precision. If all H+L combinations fit into a IEEE double precision floating point, and it is available in the Target Environment, then using H+L would eliminate some round-off error.

Less Round-Off

The encoding of ((x−H)−L) can be made more complicated to eliminate a rounding errors during this operation. True double precision requires additional instructions to track and fix the errors. This may not be at all reasonable unless each round-off error is critical. Refer to the prior art or the "Precision Increases" section in the summary of this document.

Minimal Converter (109)

See FIG. 1, near the center, on the right. The Minimal Converter (109) accepts as input a Raw Factor (205) and converts it into a Minimal Factor (237). The conversion requirements have already been described.

Polynomial Iterator (100)

See FIG. 1, near the top, and just below the Polynomial (102). The Polynomial Iterator (102) provides iterable access to all Raw Factors (205) of the root product form of the previously described Polynomial (102). A generic polynomial can be defined in many ways; therefore, the actual implementation may vary considerably. However, in the case of a standard representation of a real polynomial, as in "a*x^2+b*x+c", conversion into a root form is accomplished within a standard mathematics environment, by finding the real and conjugate factors to a sufficient precision, at the very least, two times the Target Precision plus 1 or 2 bits.

Finding Roots

If the Polynomial (102) is already in a root product form, then no root finding is needed. However, many applications begin with other representations, and the Polynomial Interface (102) must be designed to meet these needs. The most obvious example is a standard root finding based on the Newton or other root finding methods. Whatever the method chosen, it must be able to return all root parts with sufficient precision, as described for Raw Factors (205).

Ambiguity in Real Polynomials

When the imaginary part of a complex root is very small compared to the real part, then the program can mistake a conjugate pair as a pair of real roots. The opposite, mistaking a pair of real roots as a conjugate pair is also possible. This is all okay as long as roots meet the appropriate precision requirements. This ambiguity is not in conflict with the earlier described intervals of ISInterval (228) or RealPartInterval (226), For example, suppose we have an extremely large real part of a conjugate pair; so large that we are not even sure that the imaginary part exists. If the root finder is accurate (and it should be), then the computed ISInterval (228) should include the value zero!

Other Considerations:

Simple Case

If the polynomial is already in root product form, then the polynomial interface (102) is a trivial implementation of successively providing each Raw Factor (205) of the polynomial.

Exponent Ranges

The range of magnitudes of floating point exponents needed to express the numeric value of a root may be quite extensive, but for most polynomials, it will not be beyond the capability of the Constructor Environment.

Implicit Leading Constant

If all evaluated polynomials have (or any particular polynomial has) a "1" as a leading constant, then the system doesn't need to return a leading constant, of course.

Encoder (106)

See FIG. 1, just below the Raw Iterator (100). The Encoder (106) controls the conversion. First, it calls the Polynomial Iterator (100) to iterate all the Raw Factors (205). Then it ensures that each iterated Raw Factor (205) is passed to the Minimal Converter (109) to produce a Minimal Factor (237). Then, the Encoder (106) ensures that the result is passed to the Translator (114). Upon completion, the Encoder (106) signals the Translator (114) to complete any remaining operations by calling the Completion Signal Interface (110) of the Translator (114). The Encoder (106) is then ready for the next call for encoding.

CQ Arithmetic

Some basic arithmetic of complex and quaternion numbers are described.

CQAdd, CQSubtract

When adding two complex or quaternion vectors, the corresponding components are added or subtracted, respectively. Here are the forms for complex numbers. For quaternions, four values are affected.

Forms: CQAdd, or CQSubtract

Complex:
 CAdd: C0[r0,i0]+C1[r1,i1]=>Cout[r0+r1,i0+i1]
 CSubtract: C0[r0,i0]+C1[r1,i1]=>Cout[r0−r1,i0−i1]

Quaternion:
 QAdd: Q0[r0,i0,j0,k0]+Q1[r1,i1,j1,k1]=>Qout[r0+r1,i0+i1,j0+j1,k0+k1]
 QSubtract: Q00[r0,i0,j0,k0]+Q1[r1,i1,j1,k1]=>Qout[r0−r1,i0−i1,j0−j1,k0−k1]

Errors

Each of the elements of all vectors is computed as the sum of two values. When IEEE arithmetic is used, then the operations on the individual elements enjoy the same correct rounding as any other floating point operations. That is, most operations are limited to one round-off error, except during massive cancellation, as described earlier, the result is always exact.

CQ Multiplication

Multiplication of both complex and quaternion values, as described below, only produces a small number of round-off errors. The result is a new position, which is precisely located in Euclidean space, subject only to the small number of round-off errors.

Forms
 Complex: C0[r0,i0]*C1[r1,i1]=>C[−i0*i1+r0*r1,i1*r0+i0*r1]

Each of the elements is computed as the sum of 2 products of two of the original elements.

Quaternion: Q0[r0,i0,j0,k0]*Q1[r1,i1,j1,k1]=>

For quaternions, multiplication is not commutative; q0*q1!=q1*q0. Because the result is complicated, each of the four vector elements is described separately. Each of the elements is computed as the sum of 4 products of two of the original elements.

r: −i0*i1−j0j1−k0*k1+r0*r1
i: −j1*k0+j0*k1+i1*r0+i0*r1
j: i1*k0−i0*k1+j1*r0+j0*r1
k: −i1*j0+i0*j1+k1*r0+k0*r1

Operation: Basic Method

The operation begins by running the Encoder (106). The Encoder ensures completion of the operation.

Why it Works for Real Polynomials

Why does this method of transformation preserve relative precision? First, taking the product of factors only introduces round-off errors. Therefore, preservation of relative precision is dependent only upon the preservation of relative precision within each factor. Clearly, no issues arise for the leading factor, min lead factor[V] (232), which is constant. However, a more careful look is required for all forms of root factors and their relationship to the input value, x. Understanding "Correct Rounding" is fundamental; refer to the "Target Environment" in the earlier section "General Terminology". The real and conjugate factors are separately discussed.

Why it Works, for Real Factor [SV,H,L] (258)

This form, for real factors, represents ((x−H)−L), except at x==H, which is treated as a special case which has no significant error. Remember, in all cases x is an exact floating point number, H is the precisely rounded root. Let P be the target precision, then H+L, as an exact number, has at least 2*P+1 number of precise bits, because the peculiar form of separating into H and L actually achieves **2*P+1 precision, not just 2*P**. Now L may contain mantissa bits which extend beyond the 2*P+2 valid bits from the Polynomial Interface (100); where these 2*P+2 bits must be valid for all roots. But the mantissa bits of L which go beyond these 2*P+2 bits, are junk and it is absolutely critical that junk bits are avoided in the mantissa of the final sum. Thus, all of the arguments revolve around avoiding junk bits in the final sum.

Bit Patterns

Before discussing the issues, a clear understanding of three items are necessary. Suppose we have a 4-bit mantissa. That is, P equals 4. And the precision of each real root is correct for 10 bits, where 10 is equal to 2*P+2, the usual requirement for the Polynomial Interface (100). Note that the first bit, is always non-zero.

H Always has 4 Bits of High Precision.

No matter what, the H value always has full precision (P=4), and the leading bit of H is always the same as the leading bit the full root.

L May not Always be Precise

One might think that because we have 10 bits of precision in the root, that H and L can always be computed precisely. Not so. Suppose the root's bit pattern is simply "1010_0000_11bb", where the "b" bits are junk bits. Then, rounding, we have H equal to "1010", (root-H) is equal to "0000_0000_11bb". When this is rounded, and aligned, the mantissa bits for L are simply "11 bb", with two junk bits.

"Span Effect"

L can contain junk bits only when there is a separation, or "span", between the low order bit of H and the high order bit of L. Therefore, if there are "n" junk bits in L, there is the equivalent of at least "n+1" extra bits between H and L bits. This effect, I call, the Span Effect, and is important to understanding how precision is maintained in this embodiment.

Exact (x==H)

Clearly, whenever the input value for the polynomial, x, is exactly equal to H, the rounded high order value of the root, then the polynomial will evaluate correctly, because the SV value is returned as the correct value for the entire evaluation of the polynomial. No junk bits occur.

Exact (0==H)

If H is zero, then L is zero. The ((x−H)−L) reduces to "x", and since there is no operation on this exact number, the result is exact. No junk bits occur.

Exact (0==x)

When x is zero, then ((x−H)−L) reduces to ((−H)−L). By construction, the value of (−L) has a magnitude smaller than half the lowest order bit of H; therefore, ((−H)−L) is equal to −H. Thus, the result does not contain any junk bits—only a few round off errors.

(x−H), with 1 Rounding Error

A single rounding error, equal in magnitude to worst case ½ the low order bit of the result, can be produced. There are two special cases.

x and H, Different Signs

If x and H are different signs, then the magnitude of (x−H) is at least as large as the larger of the two. Therefore, the addition of "−L", by construction, is so small, by at least Target Precision bits, that it cannot affect the result, and any junk bits in L are irrelevant.

x and H, Same Sign, Abs[x]<Abs[H]/2 or Abs[x]>2*Abs[H]

Even with x and H of the same sign, and these very special conditions regarding magnitude, the magnitude of (x−H) will still be at least Abs[H]/2. When the "−L" is added, only its highest order bit can ever affect the result, and still, only by about the equivalent of 1 round-off error. Therefore, even when L is all junk, the junk bits are insignificant to the result. Actually, because of the "Span Effect", junk bits do not enter the result at all.

x and H, Same Sign, Abs[H]/2Abs[x]<Abs[H]

The x and H are the same sign and because they are of similar magnitude, cancellation, in the worst case, can be massive. However, in IEEE correct rounding, even with the massive cancellation, with these conditions, the result is absolutely exact with no round-off error what-so-ever, in terms of an exact x and an exact H. Suppose the worst case occurs when H is the next highest floating point value above x (in magnitude). That means that the smallest possible result is essentially the magnitude of the lowest order bit of H. Now, the magnitude, by construction, of L, is less than ½ the lowest order bit of H. This means, that even when L and H have almost total cancellation, the result will be at least ½ the magnitude of the lowest order bit of H. But the junk bits of L, if any, are much smaller and do not affect the result, due to the Span Effect. The massive cancellation of (x−H) only results in the loss in (P) bits. Therefore, there are over P bits of precision in the final result and the junk bits are irrelevant.

x and H, same sign, Abs[x]/2Abs[H]<Abs[x]

Again, these conditions meet the correct rounding conditions to produce an exact result for (x−H). But this case is even easier than the above case, because the result of (x−H) is as large or larger than the low order bit of H, and therefore the junk bits can have no effect, as just described in the same previous case.

Why it Works: ConjugateFactor [IS,SV,H,L] (268)

This form, for conjugate factors, is more difficult to argue, because junk bits may include not only the L (272) value, but also the IS (276) value and even the H (270) value. Recall that the mathematical meaning is (RealPart^2+IS), except at (x==H), where the special value applies. First some definitions, and then the several cases are examined to show that the result will not contain junk bits.

Imaginary Part=ImagPart

First note that the square root of IS (276) is the imaginary part, "called ImagPart", of the conjugate pair. The junk bits for ImagPart will begin at the same bit value as the junk bits in the exact root value. The details on the construction were described in the description of Raw Conjugate Factor (206).
RealSpec (275)

The real part of the complex root is computed identically to the RealSpec (275), and is seen in FIG. 3 and described under the Basic Min Factor (237) data structure. For the earlier case of a real root, only the L (272) portion might contain junk bits. However, if the ImagPart of the complex root has a large magnitude, L (272) can be all junk, and even almost all, or all, of H (270) can be junk, whenever the ImagPart is extremely large.

Case 1: ImagPart Contains Junk Bits.

Suppose the ImagPart contains junk bits. If so, then there are at least 2*P+1 bits of precision in the (H+L). In other words, in Euclidean space, the root is largely real. Not only that, but as we have discovered in the analysis of the real root, the real part can always be calculated precisely with 2*P+1 bits of precision (see above discussion on why real roots are precise). Also, note that the lead bit on the RealSpec (275) is at least equal to half of the low order bit of H (270). Also, it follows that the RealSpec (275) will be larger than the ImagPart and that the lead junk bit in ImagPart must be insignificant as compared to the RealSpec (275). This all follows from the Span Effect, described above.

Now, to compute the value of the full conjugate factor, we square the RealSpec (275) and square the ImagPart. This squaring causes the junk bits to scale based on the magnitudes of the underlying numbers. For example, suppose in a four bit mantissa system, the RealSpec (275) binary 1000, or 8, with no junk bits, but with the next bit a junk bit. And suppose the ImagPart is equal to binary 1, with all remaining bits being junk bits. After squaring, the RealSpec is equal to 1000bbb, where the bbb bits are lost because they don't fit into a 4-bit mantissa. Now, the ImagPart when squared is still equal to 1, followed by junk bits. When added together to form the conjugate value, the first 4-bit mantissa is free of junk bits. Thus, in the case where the ImagPart contains junk bits, the final result is guaranteed to be free of junk bits.

"IS" Contains No Junk Bits.

If the IS value contains no junk bits, then the calculation of the real part, may contain junk bits. However, it can be reasoned that as the real part gains another junk bit, the high order bit position of the imaginary part is increased. Thus, whichever is larger, whether the square of the real part or whether it is IS, will have full precision, and its low order bit will exceed the first junk bit of the lower magnitude value. After summing the square of RealSpec with IS, the result will contain no junk bits.

Issues for Complex/Quaternion

The product of factors for complex/quaternion numbers always preserves relative precision, subject to a few round-off errors. This is an intrinsic property of these special forms. The relative precision of each factor cannot be absolutely guaranteed, as described earlier, when the complex or quaternion root is extremely close to an input value for evaluation. However, in this very bad case, the exact sum of H+L can achieve almost arbitrarily large precision. However, the original Raw Factor (205) must be computed with extremely large precision so that each axis conversion into H and L can encode great precision. If this method of mitigating the problem is used, then any final breakdown in precision, can only result in a factor evaluation which is nearly zero, and hence the entire product of factors approaches a very tiny zero.

EMBODIMENT 2

Filter Method

FIG. 6 shows an overview of components and data objects for a Filter Method. This embodiment is an improvement upon the original Basic Method. Here, only the top-level issues are discussed, namely the insertion of either, or both, of two filters, to remove individual factors or root parts. The details, on individual filters, is discussed in later embodiments.

Data Objects
Raw Factor (205), Changes

Recall that in Embodiment 1, two data objects were an implicit guarantee, but did not have to be accessed and therefore were not really part of the embodiment. These items relate to the precision guarantee offered by the Polynomial Interface (100) when a root factor is created. In this embodiment 2, Filtered Method, the intervals associated with root parts are required. Once again, they can be implicit, but within the filtering methods some way must be found to determine them explicitly.

Implicit Versus Explicit

Here are some examples for specifying the root precision.
Implicit

The entire embodiment can be implemented under the assumption that all roots are found to a specific precision, such as two times the target precision plus 2 extra bits of precision. In this case, the precision need not be part of Raw Factors (205) which are generated. Instead, the intervals can be generated from exact numbers based on the root values.

Explicit

In this case, the interval for roots is specified explicitly. This is the most powerful method because it allows for the specification of both exact roots and roots meeting any specified precision. The absolute error in root precision is often encoded directly into high precision numbers. This method allows for specifying that roots are exact or of any quality level.

Relative Versus Absolute

Although the root precision requirements are most easily stated in terms of Relative Precision, as defined in embodiment 1, this embodiment needs the root precision in terms of absolute error. If you have roots with a known Relative Precision, how is the Relative Precision converted into an absolute error?

Real Root Conversion from Relative Precision to Absolute Error

Suppose we have a real root, r, with a Relative Precision of $2^{159}$ bits

The absolute error, within the root value, is $(2^{-159})*r$, plus or minus.

Complex Root Conversion from Relative to Absolute

Suppose we have a complex root with an absolute value of AbsRoot, and with a relative precision of $2^{-159}$. Let re and im be the real and imaginary parts of the root; therefore, AbsRoot equals the square root of $re*re+im*im$. What is the worst case absolute error for re and im? For both, the absolute error is $2^{-159}*absRoot$.

Changes from Embodiment 1

In some mathematical systems, the error in roots is automatically tracked using underlying tools. Otherwise, the following methods, or something similar, can be used.

RealPartInterval (226)

In FIG. 2, the RealPartInterval (226) is hung from the Raw Real Part (220) as an implicit guarantee. Here, the RealPartInterval (226) must provide an actual interval for processing. The extra data can be encoded directly into the Raw Real (203) within a Raw Real Part (220), or stored as an extra value.

ISInterval (228)

In FIG. 2, the ISInterval (228) is hung from the Raw Imaginary Squared (208) as an implicit guarantee. Here the ISInterval (228) holds the possible range of the true value of ExactIS (227) as its center value, and it must be accessible. For calculations to create this ISInterval (228), refer to the earlier description of the Raw CQ Factors (205) of FIG. 3.

Complex/Quaternion Root Intervals

A RealPartInterval (226) is required for each axis of a complex or quaternion root. The general calculation for complex roots was discussed in the earlier descriptions of ISInterval (228), because the ISInterval (228) is based on an underlying complex root of a conjugate pair. Generalization to quaternions is a straightforward extension because distances and errors are simply based on 4-dimensional Euclidean distances in quaternion space; the distance equals the square root of the sum of the differences squared for each axis.

Advantages of Extra Precision

In previous embodiments, nothing was gained by creating Raw Root Factors (204) with extremely small error intervals. However, when filtering, the root parts are easier to eliminate, sometimes, when extra precision is used. In particular, the requirement for a Raw Special Branch (224) can often be removed for a specific Raw Root Factor (204). In the special case where the Polynomial Iterator (100) can return exact roots (with a zero error interval), then even better. For complex and quaternion roots, the extra precision is critical when the roots approach an exact input value of the input domain.

Minimal Factors (235)

The Minimal Factor (235) form needs little if no change. When the "H" or "L" part of a root is filtered away, then the corresponding Minimal Factor (235) can be set to set to zero. Similarly for a IS (276), or imaginary squared, part of a Conjugate Factor[IS,SV,H,L] (268), the value is set to zero. Removal of the SV (274), a special value for branches, may also be removed for real polynomials, and some flag can indicate its removal.

Components

Elimination Filter (129)

The Elimination Filter (129), of FIG. 6, is used to convert an entire root factor into, simply, a lead factor. Parameters are a Minimal Factor (237) and Root Intervals (229). The output is a Minimal Factor (237) which is either the Minimal Factor (237) passed as a parameter, or a lead factor to replace it. Detailed descriptions for real can "cq" versions are described later, in separate sections.

Minimizing Filter (128)

The Minimizing Filter (128), of FIG. 6, is used to remove root parts, but not an entire root factor. Parameters are a Minimal Factor (237) and Root Intervals (229). The output is a Minimal Factor (237) which is either the Minimal Factor (237) passed as a parameter, or the factor with some parts removed (e.g. a zero for both H and L).

Extreme Improvement

Although optimizations described later allow root parts such as L and H to be eliminated, a much finer set of optimizations are easily added to the step-by-step removal process. Indeed, instead of removing only whole words, such as H and L, individual bits or groups of bits of H and L can be separately removed. Such a refinement might be useful in applications where extreme optimization might simplify bit patterns in a software floating point system. However, for most applications, there is insignificant or no payoff in reduction of memory or processing speed, as afforded by these tiny bit removals.

Translator (114), Changes

The Translator (114), of FIG. 6, can be the same as the Translator (114) of FIG. 1. However, the translator (114) must be able to recognize the removal of special branch instructions, and should optimize the removal of root parts. For example, in a real polynomial, with an L and H filtered to become zeroes, the term ((x–H)–L) can be simplified to simple (x). Another useful addition, when the elimination filter (129) is used with real and complex, is to take multiple lead factors and collapse them into a single value; this can be done by buffering the first incoming lead factor, and as additional lead factors occur, they are multiplied times the previous buffered value. Then, when the Completion Signal Interface (110) signals that no more factors are incoming, the single lead factor can be output. For quaternions, this method does not directly work, because of quaternions are not commutative under multiplication.

Encoder (106)

The Encoder (106), of FIG. 6, is almost the same as the same named Encoder (106) of FIG. 1. The only difference is that the Encoder (106) ensures the calling, with parameters, of the newly inserted filters. Note, the ordering of filters are shown with the Elimination Filter (129) before the Minimizing Filter (128), which is probably optimal, but the ordering is not critical and the same result occurs when both are used.

Real Interval Operations

In some of the following discussions, a basic understanding of real interval analysis is required. An arithmetic expression may contain intervals; these represent the uncertainty surrounding an exact value. The interval specifies the worst case minimum and maximum values; and the true value lies between the two values. When an interval is added or multiplied by another interval, then a new interval results. All operations must continue to guarantee that the true value lies somewhere within the resulting interval. Although typically supplied in a mathematical development environment, the following rules of operations are summarized here, so that no reference to other documents is required. Numeric relative precision of the extreme interval limits must be sufficiently high to track the intervals. For an interval [a,b], the "a" represents the lowest value and "b" the maximum. In all operations, rounding must be in the direction which creates the larger interval so as to preserve the guarantee that the true value lies within the interval.

Converting a Real Value, r, to an Interval.

The interval is given by Interval[r,r].

Negating an Interval[a,b]

The negation of Interval[a,b] is simply Interval[–b,–a].

Adding Interval[a,b] to a Real Value, r.

The new interval is given by Interval[a+r,b–r].

Adding Interval[a,b] to Interval[c,d]

The new interval is given by Interval[a+c,b+d].

Multiplying an Interval[a,b] by a Real Value, r

If r is zero, then the resulting interval is Interval[0,0]. If r is positive, then we have Interval[r*a,r*b]. If r is negative, we have Interval[r*b, r*a].

Squaring an Interval[a,b]

First compute a2=a*a and b2=b*b. If (a2>b2) return Interval[b2,a2], else Interval[a2,b2] The following algorithm can be taken step-by-step:

If a is zero, then return the Interval[0,b2].
If b is zero, then return the Interval[0,a2].
If both a and b are positive, return the Interval[a2,b2]
If both a and b are negative, return the Interval[b2,a2]
If (a2>b2) return Interval[b2,a2], else Interval[a2,b2]

MinAbs[Interval[a,b]], Taking the Minimum Absolute Value

This process converts an interval into a single real value. To find the minimum absolute value, MinAbs, of an interval, perform the following steps, in order:

If a or b is zero, or a<0 and b>0, then immediately return 0.
If a and b are less than zero, then immediately return −b.
If a and b are greater than zero, then immediately return a.

MaxAbs[Interval[a,b]], Taking the Maximum Absolute Value

This process converts an interval into a single real value. To find the maximum absolute value of an interval, compute the absolute value of both "a" and "b", and then take the maximum.

IntervalSqrt[Interval[a,b]], or Interval Square Root.

The interval must not contain negative values! The result is Interval[Sqrt[a], Sqrt[b]], where Sqrt[a] is rounded down towards zero, and Sqrt[b] is rounded toward positive infinity.

CQ Intervals

In the previous embodiment, multiplication, addition and subtraction were described for complex and quaternion arithmetic operations. These were specifically discussed to give meaning to the final Target Form (116). The basic operations of multiplication, addition and subtraction can be straightforwardly performed with intervals, as needed, in the Constructor Environment. Here, within the Constructor Environment, the filtering of root parts (simplification) requires processing intervals and the interval operations, including the previously discussed MinAbs and MaxAbs.

CQAbs

CQAbs is an interval function which takes the absolute value of a complex or quaternion value, either of which may contain intervals for elements of their vectors, and returns an interval. In the following discussion all values are real or real intervals. The IntervalSqrt[ . . . ] function takes the square root of a real value or real interval and returns an interval, as described above.

Forms

CAbs[Cin[r,i]]=>IntervalSqrt[r*r+i*i]
QAbs[Qin[r,i,j,k]]=>IntervalSqrt[r*r+i*i+j*j+k*k]

MinCQAbs, MaxCQAbs

These functions, MinCQAbs and MaxCQAbs, both use the CQAbs function, just described, to produce a real valued interval from the complex or quaternion value. MinCQAbs is defined by MinAbs[CQAbs[ . . . ]], and MaxCQAbs is defined by MaxAbs[CQAbs[ . . . ]]. In either case, the final result is an exact real value.

Input Domain

Filtering operations are much more powerful under some restrictions on the domain of input values. The descriptions for input domains for real and complex/quaternion cases are specified slightly differently. The following data structures appear in later diagrams describing each filter.

Real Domain (158):

The Real Domain (158), used only for real polynomials, is the domain of floating point numbers for which the real polynomial form must be able to produce precise results, in terms of Relative Precision, within the Target Environment. The input values are always interpreted as real values, as floating point values; complex numbers are never considered part of the Real Domain (158). Usually the Real Domain (158) is finite, such as all floating point values between 1 and 10. However, it may be infinite, and some filtering of root parts is still possible, but entire root factors cannot be eliminated.

Zero's and Small Numbers

A standard floating point system is implemented as mantissa and exponent. Because zero is not representable as such, it is a special case and sometimes special analysis is required. For standard hardware floating point, extremely small numbers cannot be represented; for most purposes, the Real Domain (158) is limited to those numbers which can be fully represented.

Large Numbers

Hardware floating point typically has limitations on floating point exponents. In such cases, the Real Domain (158) limited.

Multiple Zones in the Domain

In a typical evaluation of a polynomial, the values might range from 1 to 10, including all floating point values occurring between 1 and 10. The Real Domain (158) might include multiple zones such as 1 to 10 and the single value of −1. Or, the Real Domain (158) might consist only of exact points, such as 1, 1.5 and 2, and so on. Alternatively there might be some mixture between an inclusive range and individual points. This document addresses all such cases.

CQ Domain (582):

The CQ Domain (582), analogous to the previously described Real Domain (158), and is the domain of vectors (complex or quaternion) of floating point numbers for which the polynomial form must be able to produce precise results, in terms of Relative Precision, within the Target Environment.

Rectangular Domain

Consider each axis as a separate from the others. For example, consider the complex case where the real values are between 2 and 6 and the imaginary values are between 3 and 7. Thus, a rectangle in the complex plane is formed with all included floating point locations. For quaternions, the domain would be a four dimensional rectangular domain.

Sparse Rectangular Domain

Many interesting applications exist for using approximating polynomials for a group of data. For example, consider integral points 1 through 1000 on each axis, which forms a set of 1,000,000 points. A complex polynomial can be used to approximate all 1,000,000 points. In such a case, billions of floating point values exist between each point of the domain. Quaternion input domain can be similarly defined.

Scattered Point Domain

A CQ polynomial might be used to approximate a scattered set of points. In a very simple complex case, the points might be located at, say, {{0,1}, {3,5}, . . . }. Each of these points may represent a complex value for approximation. Similarly, for quaternions, scattered points each have four elements.

Relative Precision Topics

Relative Precision Goal, or RPG (160)

The Relative Precision Goal, or RPG, is a goal, as a positive number, for all computations under consideration. The goal is typically the value two raised to a power equal to the negated Target Precision, with some adjustments. For example, when using IEEE double precision, with a Target Precision of 53, the RPG equals 2^(−53), where the "^" is used to specify raising-to-a-power. Generally, for relative precision, the smaller the RPG requirement, then less filtering takes place and the quality should be better. Actually, a value a little larger will provide extra filtering, which may eliminate round-off errors during evaluation because there are fewer root parts. Therefore, the RPG value is generally fine-tuned by increasing it. For example, multiplying by 4, 8, and 16 should be good compromises for real, complex, and quaternion cases, respectively.

Relative Precision Inequality

Overview

Basic Inequality

Recall the definition of Relative Precision:

Abs[TrueValue−ApproximateValue]/Abs[TrueValue]

The Relative Precision Inequality specifies a test to determine when the Relative Precision meets a criteria. Based on the original Relative Precision definition, a test for adequate precision is given by:

RelativePrecisionInequality=Abs[TrueValue−ApproximateValue]≦RPG*Abs[TrueValue]

In the above inequality, RPG stands for RPG (160), described above. The approximate value is the value represented by a Minimal Factor (237).

Misleading "True" and "Approximate"

The TrueValue is the true value of the root factor, which usually requires intervals because the exact value of the root is not always possible to represent as an exact number. Careful, the ApproximateValue, is an approximation, but is composed of exact numbers without any intervals!

Zeroes on Both Sides

Note the use of "≦" instead of "<" within the inequality. In cases of exact root values, the equality is critical because the test should pass when both sides of the inequality are zero.

Real Inequality

Because the relative precision inequality uses intervals, the inequality must be converted back to exact real values in order to unambiguously decode the inequality. For real polynomials, this is done with the MinAbs and MaxAbs interval functions, which have already been described. MaxAbs is used on the left side to ensure borderline failures; MinAbs is used on the right side for the same purpose.

RealInequality=MaxAbs[TrueValue−ApproximateValue]≦RPG*MinAbs[TrueValue]

CQ Inequality

Similar to the case of real polynomials, the CQ Inequality uses MaxCQAbs and MinCQAbs for MaxAbs and MinAbs, respectively.

CQInequality=MaxCQAbs[TrueValue−ApproximateValue]≦RPG*MinCQAbs[TrueValue]

Filter: Elimination R Filter

Overview:

FIG. 7 shows an the Elimination R Filter (131), which is the form of an Elimination Filter (128), of FIG. 6, for real polynomials. In some polynomial applications, Polynomials (102) may occur which have Raw Root Factors (204) that use a root with a gigantic absolute value. Consider the construction or meaning of the real part of a real root, which includes (x−H). If H is very large, then any value of x, even at the extremes of the Real Domain (158), may become insignificant. Therefore, the term (x−H), can be replaced by −H. However, without an x variable, the entire Raw Root Factor (204) becomes a constant factor, just like the Lead Factor [V] (232), where the constant value, V (269), is set to −H. A similar method allows for the elimination of conjugate pairs. Floating point systems often have an almost unlimited number of input points, and the elimination must, in effect, test all these points. However, it is possible to find one point, that if it passes the test, then all points pass will pass the test.

Thus, two important techniques are involved. First, the application of the Real Inequality (described previously), and, secondly, the selection of a value of "x".

Analysis:

The elimination of root factor simplifies the Target Form (116) and speeds evaluation. However, the bigger impact may very well be that it eliminates processing which requires extremely large exponents. How? Suppose we have a polynomial equal to $(2^{\wedge}(-10000)*(x-4)*(x-2^{\wedge}10001))$, with an input range of 2 to 10. The leading constant is "v", equal to out-of-range value of $2^{\wedge}(-10000)$. Notice that for all elements of the Real Domain (158), the x in the factor $(x-2^{\wedge}10001)$ contributes nothing to the result. Now, the because the $(x-2^{\wedge}10001)$ factor can be eliminated, leaving $(2^{\wedge}(-10000))*(x-4)*(-2^{\wedge}10001)$. However, the Translator (114) collapses the two leading factors into $(-2*(x-4))$; the result is simple to compute with normal hardware floating point throughout the range of 2 to 10.

Data Objects

Far Point (402)

This value, a location in the Real Domain (158), always holds a location for testing. The creation and use are described later.

Real Location (404)

The Real Location (404) specifies a position on the real axis, as the exact center of a real root part, as taken from the ExactRealPart (225) of the Raw Real Part (220) defined within a Raw Root Factor (204). This is valid for both real and conjugate factors.

Components

Get Far Point (414)

The routine Get Far Point (414), see FIG. 7, returns the point within the Real Domain (158) which is furthest from the parameter Real Location (404), previously described. The Real Location (404) is an exact value, and its distance from either the minimum and maximum points of the Real Domain (158) are both easily computed. If the minimum domain point is furthest away from the Real Location (404), then this minimum domain point is returned; otherwise the maximum domain point is returned.

Real Root Eliminator (192)

The Real Root Eliminator (192) is shown near the center of FIG. 7.

Parameters include a Raw Real Factor (214) and a Real Factor[SV,H,L] (258) containing the current Minimal R Factor (236), together with the value for RPG (160), all previously described. This component, if successful, converts the Real Factor[SV,H,L] (258) into a Lead Factor[V] (202) which is returned. For a failure to pass the inequality test, the same Real Factor[SV,H,L] (258) is returned as the result in a Minimal R Factor (236), as shown in FIG. 7.

Step 1: Find the Far Point (412)

Call Get Far Point (414) to find the Far Point (412). In addition to the Real Domain (158), this call requires a Real Location (404). This value is treated as an exact value, and its derivation was discussed above.

Step 2: Real Inequality with Substitutions

Recall the RealInequality, developed earlier. The RPG is simply the RPG (160) value, previously described.

MaxAbs[TrueValue−ApproximateValue]≦RPG*MinAbs[TrueValue]

Substitutions will be made for each value.

TrueValue

For "TrueValue", substitute the value of (FarPoint (412)−RealPartInterval (226)). The FarPoint (412) value was computed in Step 1. The RealPartInterval (226) is a subcomponent of a parameter, Raw Real Factor (214).

ApproximateValue

The ApproximateValue is given as (−(ExactRealPart)), where ExactRealPart, or ExactRealPart (225), is taken from the Raw Real Factor (214). There is no x in this root factor term, because the whole purpose of elimination is to ignore the value of x!

Step 3: Test and Return

If the inequality of Step 2 returns false, then the entire elimination fails and no filtering is performed on the root factor. Otherwise, a Lead Factor (232) is returned in the Minimal R Factor (236). The value for the Lead Factor is set to the ApproximateValue, as computed above.

Conjugate Pair Eliminator (194)

The Conjugate Pair Eliminator (194), found bottom-center in FIG. 7, operates on conjugate pairs, analogously to the way the Real Root Eliminator (192), previously described, operates on real roots. Parameters include a Raw Conjugate Factor (206) and a Conjugate Factor[IS,SV,H,L] (268), containing the current Minimal R Factor (236), together with the value for RPG (160), all previously described. This component, if successful, converts the Conjugate Factor[IS,SV,H,L] (268) into a Lead Factor[V] (202) which is returned. For a failure to pass the inequality test, the same Conjugate Factor[IS,SV,H,L] (268) is returned as the result in a Minimal R Factor (236), as shown in FIG. 7.

Step 1: Find the Far Point (412)

Call Get Far Point (414) to find the Far Point (412). In addition to the Real Domain (158), this call requires a Real Location (404). This value is treated as an exact value, and its derivation was discussed above.

Step 2: Real Inequality with Substitutions

Recall the RealInequality, developed earlier. The RPG is simply the RPG (160) value, previously described.

$$\text{MaxAbs[TrueValue-ApproximateValue]} \leq \text{RPG*MinAbs[TrueValue]}$$

Substitutions will be made for each value.

TrueValue

For "TrueValue", substitute the value of ((FarPoint (412)–RealPartInterval (226))^2+ISInterval (228)). The FarPoint (412) value was computed in Step 1. The RealPartInterval (226) is an interval subcomponent of a parameter, Raw Real Spec (218) of the Raw Conjugate Factor (206), and the ISInterval (228) is specified by the Raw Imaginary Squared (208) of the same Raw Conjugate Factor (206).

ApproximateValue

The ApproximateValue is given as ((−ExactRealPart))^2+ ExactIS (227), where ExactRealPart, or ExactRealPart (225), is taken from the Raw Real Spec (218) of the Raw Conjugate Factor (206). The ExactIS (227) is taken from the Raw Imaginary Squared (208) of the same Raw Conjugate Factor (206). There is no x in this root factor term, because the whole purpose of elimination is to ignore the value of x!

Step 3: Test and Return

If the inequality of Step 2 returns false, then the entire elimination fails and no filtering is performed on the root factor. Otherwise, a Lead Factor[v] (232) is returned in the Minimal R Factor (236). The value for the Lead Factor is set to the ApproximateValue, as computed above.

Elimination R Filter (131):

We can now discuss the interactions of the components comprising the Elimination R Filter (131). Several of the following actions require a Real Domain (158) and a RPG (160); these were previously described. Refer to FIG. 7. Given a Minimal R Factor (205) as input, three choices exist, which are now described. If the input is a Lead Factor (232), then return it without any additional actions. If the input is a Real Factor[SV,H,L] (258), a root elimination is attempted by calling the Real Root Eliminator (192) and the result is returned. If the input is a Conjugate Factor[IS,SV,H,L] (268), a root elimination is attempted by calling the Conjugate Root Eliminator (194) and the result is returned.

Filter: Elimination CQ Filter

Overview:

FIG. 8 shows an the Elimination CQ Filter (594), which is the form of an

Elimination Filter (128), of FIG. 6, for complex/quaternion polynomials. This filter is analogous to the previously described filter, the Elimination R Filter (131), of FIG. 7.

Data Objects

CQ Far Point (605)

This value is a location in the CQ Input Domain (582), used for testing with the CQ Relative Precision Inequality. The creation and use are described later.

CQ Location (606)

The CQ Location (606) is analogous to the Real Location (404) of earlier embodiments. The CQ Location (606) specifies a position, either complex or quaternion, as the exact center of the root within a Raw CQ Root Factor (526). Thus, for each axis of the root, as a vector, it represents the Exact-RealPart (225), as previously described.

Components

Get Far CQ (600)

The routine Get Far CQ (600) returns the point within the parameter

CQ Input Domain (582), which is furthest from the parameter CQ Location (606), previously described. All values within the CQ Input Domain and the CQ Location are exact; if the CQ Input Domain (582) includes a Rectangular Domain (or a Sparse Rectangle Domain), then we can find the furthest point from the rectangle (or 4th dimensional quaternion rectangle) by checking the Euclidean distance to the vertex points of the rectangle; the largest distance wins. If the CQ Input Domain (582) contains sparse points, then each is checked; the furthest away from the CQ Location (606) wins. In the case of a tie, it doesn't matter which point is chosen. The furthest point is returned, and is called the CQ Far Point (605), as is shown as a return value on the middle-right of FIG. 8.

CQ Root Eliminator (602)

The CQ Root Eliminator (602) is shown near the center of FIG. 8. Previously described, the parameters include a Raw CQ Factor (520), and a Minimal CQ Factor (550). The RPG (160) is also a parameter. This component, if successful, converts the Minimal CQ Factor (550) into a CQ Lead Factor [VCQ] (554).

Step 1: Find the CQ Far Point (600)

Call Get Far CQ (414) to find the CQ Far Point (605). In addition to the CQ Input Domain (582), this call requires a CQ Location (606). This vector location is simply the rounded location, to Target Precision, of the complex or quaternion root axes specified by all the Raw Real Parts (220) found within the Raw CQ Root Factor (526).

Step 2: Find the "ApproximateValue"

The Approximate value is the value of the proposed root factor without consideration of the x (278). This value is a vector, complex or quaternion, constructed from a Raw CQ Root Factor (526). Each element of the vector is set to (−(ExactRealPart)), where ExactRealPart, or ExactRealPart (225), is taken from the Raw Real Part (220), of each axis of the Raw CQ Root Factor (526).

Step 3: Find the "TrueValue"

The true value is the value of the true root factor. The value is the difference between the CQ Far Point (600) constructed in Step 1, and the corresponding value RealPartInterval (226) from each axis of the Raw CQ Root Factor (526).

Step 4: Relative Precision Inequality

Recall the CQ Inequality. The RPG (160) value has already been described. The TrueValue and ApproximateValue were found in steps 2 and 3.

$$\text{CQInequality=MaxCQAbs[TrueValue-ApproximateValue]} \leq \text{RPG*MinCQAbs[TrueValue]}$$

Step 5: Test and Return

Return failure, or false, when the inequality fails, and pass the input Minimal CQ Factor (550) as the return value; otherwise, for success, return a CQ Lead Factor[VCQ] (554) in the Minimal CQ Factor (550), with the lead value equal to the ApproximateValue computed in step 2.

Elimination CQ Filter (594)

We can now discuss the interactions of the components comprising the Elimination CQ Filter (594). Several of the following actions require a CQ Input Domain (582) and an RPG (160); these were previously described. Refer to FIG. 8. Given a Minimal CQ Factor (550) as input, and shown top-left of FIG. 8, two choices of action exist:

CQ Lead Factor[VCQ] (554)

If the Minimal CQ Factor (550) is a CQ Lead Factor[VCQ] (554), then the input Minimal CQ Factor (550) is returned.

CQ Root Factor[HLVecCQ] (552)

If the Minimal CQ Factor (550) is a CQ Root Factor [HLVecCQ] (552), the result is set to the result of calling the CQ Root Eliminator (602), with the CQ Root Factor [HLVecCQ] (552) and original Raw CQ Factor (205) as parameters.

Filter: Minimizing R Filter

The Minimizing R Filter (133) is a form of Minimizing Filter (128), as described in the Filter Method of FIG. 6. Turn now to FIG. 9.

Algorithm:

For each factor, the Raw Real Part (220) defines the location of the real part of the root. With respect to this value, the nearest point of the Real Domain (158) is found; the Real Domain (158) is described below. This point, used as the x (278) in the polynomial, is used to evaluate the loss of Relative Precision occurring when the Raw Root Factor (204) is evaluated (with its guaranteed high precision) versus the encoding by a proposed factor with root parts removed.

Analysis:

When the value of a root approximates a high-precision raw root value, the point in the Real Domain (158) nearest the approximate root suffers the greatest loss of relative precision. Therefore, all testing for root part removal, for each individual root factor, involves testing only this nearest domain point. If removing a root part doesn't affect the achievement of Target Precision during evaluation at this near point, then the root part is safely removed. The process is complicated only in that interval analysis, on simple real intervals involving simple arithmetic operations, is required.

Data Objects

Filter Tags (229)

The Filter Tags (229) data object simply lists which of the root parts can be eliminated. For real roots, the following data objects were previously described: H (269), L (272), and SV (274). For conjugate roots the IS (276) also applies. Each of these root parts has an associated tag to indicate removal of that root part. Note that Filter Tags (229) specifies a group of tags, which may be empty, or may include the complete list of possible tags, with up to three tags for real roots and four tags for conjugate roots.

Boolean (154)

The Boolean (154) holds a success/failure, or true/false, value to indicate success or failure of an operation.

Special Flag (405)

This Special Flag (405) is a boolean flag which is true to indicate that for the current test, the SV (274) will be part of the relative precision test.

Near Point (402)

This value is a point, a floating point value, within the Real Domain (158). It is called a "near" point, because it represents a value close to the real part of the root. Its exact construction is described later, within the component which creates it, called Get Near Point (400).

Real Test (408)

This data structure packages all the information for testing root part removal for a real root. This includes a Raw Real Factor (214), Real Factor[SV,H,L] (258), and Near Point (402).

Conjugate Test (410)

This data structure packages all the information for testing root part removal for a conjugate root. This includes a Raw Conjugate Factor (206), Conjugate Factor[IS,SV,H,L] (268), and Near Point (402).

Components

Real Tag Iterator (300)

The Real Tag Iterator (300), as shown near the top-left of FIG. 9, is called exclusively by the Real Root Simplifier (172), described later, to provide a series of Filter Tags (229). Each of these Filter Tags (229) specifies the removal of zero or more root parts. The iteration provides successive Filter Tags (229) in a prioritized order. For example, if the first iteration of Filter Tags (229) specifies only the removal of the SV value, then if successful, there is no way to eliminate both the SV (274) value and the L (272) value, because the first iteration already produced a successful result.

Prioritized Tags of FIG. 7

Now, turn to FIG. 10, which identifies possible sets of tags for the Real

Tag Iterator (300). These choices are listed by a typical priority, top to bottom. Note, that removal of SV (274) is higher priority than all cases of not removing SV (274); this is typical and probably reasonable for almost any application. Removal of the most number of root parts is another criteria determining the ordering of tags. When a group of such tags, Filter Tags (229), later prove successful, then one or more root parts are removed. Note that the lowest priority item is the Real Failsafe (325) which always succeeds because it specifies to keep all root parts.

Real Remove SV (312)

This group of choices all specify elimination of the SV (274).

Real Keep SV (314)

This group of choices results in keeping SV (274).

Real Tags (310)

This group represents all possible choices of Real Tags (310). The group is divided between Real Remove SV (312) and Real Keep SV (314), because later processing is different for each of these.

Conjugate Tag Iterator (301)

The Conjugate Tag Iterator (301), as shown near the bottom-middle of FIG. 9, is called exclusively by the Conjugate Pair Simplifier (178), described next, to provide a series of Filter Tags (229). Each of these Filter Tags (229) specifies the removal of root parts. The iteration provides the list of Filter Tags (229) in a prioritized order.

Prioritized Tags for Conjugate Pairs

Now, turn to FIG. 11, which identifies possible sets of tags for the Conjugate Tag Iterator (301). These choices are listed by a typical priority, top to bottom. Note, that removal of SV (274) is high priority; this is typical and probably reasonable for almost any application. Note, removal of the most number of root parts is another criteria determining the ordering of tags. When a group of such tags, Filter Tags (229), later prove successful because the root parts can be eliminated, then the specified root parts are removed. Note that the lowest priority item is the Conjugate Failsafe (371), which always succeeds.

Removing the IS (272)

Any removal which includes removal of IS (276), effects a pair of real roots because the imaginary part is removed. The remaining tags are used as Real Tags (310) to effect the elimination of real root parts, as described in the previous section.

Not Removing the IS (276)

Any removal which does not include removal of IS (276) effects a true conjugate pair. All tags are used as Real Tags (310) to effect the elimination of real root parts, as described in the previous section.

Conjugate Remove SV (340)

This group of choices all specify elimination of the SV (274), the special branching.

Conjugate Keep SV (362)

This group of choices keeps SV (274).

Conjugate Tags (330)

This group represents all possible choices of Conjugate Tags (310). The group is divided between Conjugate Remove SV (340) and Conjugate Keep SV (362) because later processing is different for each of these.

Get Near Point (400)

Refer now to FIG. 9, which shows the details of the filtering actions. On the right-hand side of FIG. 9, is the Get Near Point (400). This component takes three parameters, the unchanging Real Domain (158), the Real Location (404), and a flag, called the Special Flag (405) data object. This component returns a test point called the Near Point (402), which is always a point found within the Real Domain (158). Two different methods are used, depending upon whether or not the Special Flag (405) is true or false. Note, this component is used for both real and conjugate roots. First, the Real Location is rounded to an H (270) value, which is the target number rounded (round-to-even). Note, in either case, the value returned can be zero.

Special Flag (405), a parameter, is False

The just described H (270) value is returned. This is the Real Domain (158) location which shows the worst degradation from a root part removal.

Special Flag (405), a Parameter, is True

In this case, the technique of using a special branch instruction for a specific domain point, is used. The special branch is used when an input value for evaluation, x (278), is exactly equal to the rounded value, to target precision, for the H (270) location derived from the Real Location (404). Such a branch ensures that the polynomial always evaluates correctly, for x equal to H, no matter how poorly any factor computes its individual value. Therefore, there is nothing useful in testing the location where branching occurs, because the branch ensures success. Therefore, the next nearest point of the Real Domain (158) is returned.

Real Factor Check (406)

This component, Real Factor Check (406), is the low level component to check if a specific set of root parts, can be removed without affecting the Relative Precision for any evaluation within the Real Domain (158), for a specific Raw Real Factor (214) and Real Factor[SV,H,L] (258). Specifically, this component tests the amount of Relative Precision at a specific location and returns a Boolean (154), described earlier. The test must pass, or the component returns Boolean (154) indicating failure.

Parameters

The changeable input parameters are packaged, arbitrarily, into a single structure called the Real Test (408), which was previously described. The RPG (160) value is also provided.

Overview

In the following discussion, x (278) is used to represent the variable which takes on the test point Near Point (402), a parameter found in the Real Test (408) structure. First, an inequality is developed. If the inequality evaluates to True, then the root part removal is okay.

Step 1, Find "TrueRealPart"

In FIG. 2, underneath Raw Real Part (220), which is part of the Raw Real Factor (214) parameter, is the RealPartInterval (226). The value of TrueRealPart is set to this RealPartInterval (226).

Step 2, Find "TrueValue"

The TrueValue represents the evaluation of a factor and is given by computing the interval number given as (x−r), where x is the Near Point (402), and "r" is the TrueRealPart of Step 1.

Step 3, Find "UseRealPart"

A "UseRealPart" value is computed directly from the H (270) and L (272) parts of the Real Factor[SV,H,L] (258), which is passed as a parameter. UseRealPart is set to the exact number H+L.

Step 4, Find "ApproximateValue":

The ApproximateValue represents the evaluation of a factor and is given by computing the exact number given as (x−r), where x is the Near Point (402), and "r" is the UseRealPart of Step 3.

Step 5, Relative Precision Inequality Testing

Recall the Real Inequality and make substitutions for RPG (160), a parameter, and the TrueValue and ApproximateValue, as found in steps 2 and 4.

MaxAbs[TrueValue−ApproximateValue]≦RPG*MinAbs[TrueValue]

Step 6, Testing

If the inequality evaluates to True, then return from the component with Boolean (154) as True; otherwise return false.

Real Root Simplifier (172)

The Real Root Simplifier (172) is shown upper-center in the FIG. 9. This component attempts to find the simplest form for the Real Factor[SV,H,L] (258) based on the Real Tag Iterator (300) priority for attempting the removal of root parts. This component loops through all the iterates available in the Real Tag Iterator (300); see upper-left of FIG. 9. See Step 5, below, for exit conditions.

Step 1: Find the Near Point (402)

Call Get Near Point (400) to find the Near Point (402). This call need only be performed once, and the same value used for each iteration. In addition to the Real Domain (158), this call requires two parameters. The first, Real Location (404), was discussed in the "Filter: Elimination R Filter". The second, the Special Flag (405) is a boolean which is set true when the current iterate Filter Tags (229) does not include a tag to remove the Raw Special Branch (224); otherwise it is set to false.

Step 2: Temporary Real Factor[SV,H,L] (258)

Using the current iterates Filter Tags (229) construct a temporary Real Factor[SV,H,L] (258). Initialize the temporary variable with the parameter Real Factor[SV,H,L] (258), and then use the Filter Tags (229) to clear specific values. For example, if the Filter Tags (229) has a SV tag, then remove the SV (274) value from the temporary Real Factor[SV,H,L] (258). Similarly, the H and V values of the temporary Real Factor[SV,H,L] (258) are set to zero if the corresponding tags are set within the current Filter Tags (229).

Step 3: Construct a Real Test (408)

The Real Test (408), already described, is a data structure for holding all the parameters to test a specific root part removal using the Real Factor Check (406). The required Raw Real Factor (214) is a parameter to the entire component. Use the temporary Real Factor[SV,H,L] (258) constructed in Step 2 as the required Real Factor (214). The required Near Point (402) is the value from Step 1.
Step 4: Call the Real Factor Check (406)
The Real Test (408) is passed as a parameter to the Real Factor Check (406), which returns a Boolean (154) as a result.
Step 5: Check Boolean Result
If the Boolean (154) result, which was returned in Step 4, is True, then processing of the entire component is completed and successful, and the temporary Real Factor[SV,H,L] (258) from Step 2 is returned as the result of the filter. If the current iterate of Filter Tags (229) indicates an empty list of tags, then the test should have passed, and a serious error is returned! Otherwise, the next iterate is found by calling the Real Tag Iterator (300) and returning to Step 1.
Conjugate Factor Check (413)
Refer to the bottom-right corner of FIG. 9. This component, the Conjugate Factor Check (413) is analogous to the previously described Real Factor Check (406). However, in this case, the resulting factor is for a conjugate pair.
Parameters
The input parameters are packaged, arbitrarily, into a single structure called the Conjugate Test (410), which was previously described; it includes a Raw Conjugate Factor (206), Conjugate Factor[IS,SV,H,L] (268), and Near Point (402). The RPG (160) is shown as separate parameter.
Overview
This component operates in a manner analogous to the Real Factor Check (406).
Step 1, Find TrueRealPart
In FIG. 2, underneath Raw Real Part (220), which is part of the Raw Conjugate Factor (206) parameter, is the RealPartInterval (226). The value of TrueRealPart is set to this RealPartInterval (226).
Step 2, Find TrueISPart
In FIG. 2, within Raw Conjugate Factor (206), the ISInterval (228) is found (at the bottom of the figure). Use the ISInterval (228) as the value of the TrueISPart.
Step 3, Find TrueValue
The TrueValue is the true value of the root factor, including intervals, unless the root is known exactly. The general form is given by $((x-r)^2+c)$, where substitutions are made as follows. The x is given the value of the Near Point (402) parameter. The r is given the value of the TrueRealPart of Step 1. The c is the value of TrueISPart from Step 2.
Step 4, Find UseRealPart
A "UseRealPart" value is computed directly from the H (270) and L (272) parts of the Conjugate Factor[IS,SV,H,L] (268), which is passed as a parameter. UseRealPart is set to the exact number H+L.
Step 5, Find "UseISPart"
The UseISPart is set to the IS (276) value within the Conjugate Factor[IS,SV,H,L] (268), passed as a parameter.
Step 6, Find "ApproximateValue":
The ApproximateValue represents the evaluation of a factor and is given by computing the exact number given as $((x-r)^2+c)$, where x is the Near Point (402), and "r" is the UseRealPart of Step 4, and "c" is the UseISPart of step 5.
Step 7, Relative Precision Inequality Testing
Recall the CQ Inequality and make substitutions for RPG (160), a parameter, and the TrueValue and ApproximateValue, as found in steps 3 and 6.

$$CQInequality = MaxCQAbs[TrueValue-ApproximateValue] \leq RPG*MinCQAbs[TrueValue]$$

Step 8, Testing
If the inequality evaluates to True, then return from the component with Boolean (154) as True; otherwise return false.
Conjugate Pair Simplifier (178)
The Conjugate Pair Simplifier (178) is shown lower-center in the FIG. 9.
This component attempts to find the simplest form for the Conjugate Factor[IS,SV,H,L] (268) based on the Conjugate Tag Iterator (301) priority for attempting the removal of root parts. This component loops through all the iterates available in the Conjugate Tag Iterator (301); see lower-left of FIG. 11. See Step 5, below, for exit conditions.
Step 1: Find the Near Point (402)
Call Get Near Point (400) to find the Near Point (402). In addition to the Real Domain (158), this call requires two parameters. The first, Real Location (404), was discussed in the "Filter: Elimination R Filter". The second, the Special Flag (405) is a boolean which is set true when the current iterate Filter Tags (229) does not include a tag to remove the Raw Special Branch (224); otherwise it is set to false.
Step 2: Temporary Conjugate Factor[IS,SV,H,L] (268)
Using the current iterates Filter Tags (229) construct a temporary Conjugate Factor[IS,SV,H,L] (268). Initialize the temporary variable with the parameter Conjugate Factor[IS,SV,H,L] (268), and then use the Filter Tags (229) to modify specific values. For example, if the Filter Tags (229) has a SV tag, then clear the SV (274) value from the temporary Conjugate Factor[IS,SV,H,L] (268).
Step 3: Construct a Conjugate Test (410)
The Conjugate Test (410), already described, is a data structure for holding all the parameters to test a specific root part removal using the Conjugate Factor Check (413). The required Raw Conjugate Factor (206) is the current Raw Conjugate Factor (206) which is to be simplified. The Near Point (402) is the value from Step 1. The required Conjugate Factor[IS,SV,H,L] (268) is the temporary Conjugate Factor [IS,SV,H,L] (268) from Step 2.
Step 4: Call the Conjugate Factor Check (413)
The Conjugate Test (410) is passed as a parameter to the Conjugate Factor Check (413), which returns a Boolean (154) result. The RPG (160) is also a parameter.
Step 5: Check Boolean Result
If the Boolean (154) result, which was returned in Step 4, is True, then processing of the entire component is completed and successful, and the temporary Conjugate Factor[IS,SV,H,L] (268) from Step 2 is returned as the result of the filter. If the current iterate of Filter Tags (229) indicates an empty list of tags, then the test should have passed, and a serious error is returned! Otherwise, the next iterate is found by calling the Conjugate Tag Iterator (301) and returning to Step 1.
Minimizing R Filter (133)
The Minimizing R Filter (133) is found at the center left of FIG. 9. This filter is a form of the Minimizing Filter (128) found in FIG. 6. In this case, the filter is used for real polynomial factors. Two parameters are used, in addition to global parameters for the Real Domain (158) and the RPG (160). The first parameter is the Minimal R Factor (236), and a corresponding Raw R Factor (201) provides intervals for approximate roots. Based on the three possible factors which can be stored a Minimal R Factor (236), the following actions are taken.
Lead Factor (232)
For a Lead Factor (232) no action is taken, and the component returns the same Minimal R Factor (236).
Real Factor[SV,H,L] (258)
In this case, the Real Root Simplifier (172) is called, using the following parameters: the Minimal R Factor is used as the Real Factor[SV,H,L] (258) parameter, the Raw Real Factor (214) parameter is set to the Raw R Factor (201) provided as input. The result of the call is then returned as the result for the entire component.

Conjugate Factor[IS,SV,H,L] (268)

In this case, the Conjugate Root Simplifier (178) is called, using the following parameters: the Minimal R Factor is used as the Conjugate Factor[IS,SV,H,L] (268) parameter, the Raw Conjugate Factor (206) parameter is set to the Raw R Factor (201) provided as input. The result of the call is then returned as the result for the entire component.

Filter: Minimizing CQ Filter

FIG. 12 shows components and data objects for a Minimizing CQ Filter (572), which is a form of Minimizing Filter (128) for complex and quaternion polynomials.

Data Objects

CQ Tags (574)

CQ Tags (574) of CQ embodiments specify removal of H and L values for each of the elements of the axes: two sets of tags for complex and four sets of tags for quaternion.

CQ Near Points (604)

CQ Near Points (604) is analogous to the Near Point (402) of earlier embodiments. In typical applications, it will hold a single complex or quaternion point represented using Target Numbers to form a vector of values; however, when the number of points in the CQ Input Domain (582) is small, then every single point can be tested. When the CQ Input Domain (582) is a "Scattered Point Domain", as described, then a list of points may be needed for testing. See the Get Near CQ (587), below.

CQ Test (584)

This data structure packages all the information for testing root part removal for a CQ root. This includes a Raw CQ Root Factor (526), CQ Root Factor[HLVecCQ] (552), and CQ Near Points (604).

Components

CQ Tag Iterator (588)

The CQ Tag Iterator (588), as shown near the bottom-left of FIG. 12, is called exclusively by the CQ Root Simplifier (590), described later, to provide a series of CQ Tags (574). Two approaches are proposed.

Combinatorial Approach

Each of these CQ Tags (574) specifies the removal of zero or more root parts. For each axis (two for complex, four for quaternion), specify the setting to zero of one of: {H* and L*}, {H*}, { }, of a HLVecCQ (567) from the CQ Root Factor[HLVecCQ] (552). With three choices for 2 axes, 9 possibilities occur; for quaternions, with four axes, there are 81 possibilities. The iteration should provide successive CQ Tags (574) in a prioritized order, so that the maximum number of root parts are set for removal, before successively less parts are removed.

Priority Order

Unlike, the real polynomial case, where a clear priority of tags can be established, for the CQ Tag Iterator (588), the best approach is not so obvious. Of course, for any one axis, removal of both H and L is top priority, followed by removal of just L, and then trying using both the H and L parts. One simple approach which might be optimal in most cases, is to simply preserve root parts based on their numeric magnitude. This requires knowledge of the root part sizes, as indicated by the dotted line in FIG. 12 between the CQ Location (606) to the CQ Tag Iterator (588). A big advantage of this approach is the much smaller number of test cases than the combinatorial approach; for example, the complex case has only 5 cases, whereas 9 cases were used in the above combinatorial approach.

Complex Example

For example, for a complex number, suppose we have, for root parts: Hr=10000, Lr=10, Hi=4, and Li=0.01. In this case, we might use the following tag sequence, in priority order:

{{Hr, Lr}, {Hi,Li}}, remove all root parts
{{Lr}, {Hi,Li}}, keep largest magnitude
{{ },{Hi,Li}}, keep two largest magnitudes
{{ },{Li}}, keep three largest magnitude
{{ },{ }}, keep all Quaternion Example For example, for a quaternion number, suppose we have: Hr=10000, Lr=10, Hi=4, and Li=0.01, Hj=20, Lj=0.0000001, Hk=0,Lk=0. In this case, we have Hk=0 and Lk=0, and therefore, for this axis, no tags are required. For this example, we could have the following sets of tags.

{{Hr, Lr}, {Hi,Li}, {Hj,Lj},{ }}, remove all nn-zero root parts
{{Lr}, {Hi,Li}, {Hj,Lj}}, keep largest magnitude
{{Lr},{Hi,Li}, {Lj},{ }}, keep two largest magnitudes
{{ },{Hi,Li}, {Lj},{ }}, keep three largest magnitudes
. . . and so on . . .
{{ },{ },{ },{ }}, keep all Get Near CQ (587)

At the bottom, of the FIG. 12, is the Get Near CQ (587). This component takes two parameters, the unchanging CQ Input Domain (582) and the CQ Location (606). Recall that the CQ Input Domain (582), is typically a simple form of either a Rectangular Domain or a Sparse Rectangular Domain. For these two cases, only one CQ vector point is returned in the CQ Near Points (604); and that point is found separately for each axis. For example, for the real axis, the Exact Real Part (220), within the Raw R Factor (530), of FIG. 12, is use to find the nearest real axis value of the CQ Input Domain (582); and that nearest real axis value is used. The same is done for all remaining axes. If there are only a small number of points in the entire CQ Input Domain (582), then all points can be returned as part of the CQ Near Points (604).

CQ Factor Check (586)

This component, CQ Factor Check (586), is the low level component to check if a specific set of root parts can be removed without affecting the Relative Precision for any evaluation within the CQ Input Domain (582). Specifically, this component tests an inequality and returns a Boolean (154), described earlier. The test must pass, or the component returns Boolean (154) indicating failure.

Parameters

Most input parameters are packaged, arbitrarily, into a single structure called the CQ Test (584), which was previously described. The RPG (160) value is also provided.

Algorithm

This algorithm is implemented similar to the Real Factor Check (406) algorithm, described in earlier embodiments for real polynomials. In this case, values are complex or quaternion. Also, in some implementations, multiple points in the CQ Near Points (604) are possible, and to pass the test, all points must pass; for this, simply run the following steps until a failure or all pass. The relative precision is tested using the CQInequality, described earlier. The "Near Point Iterate", is the iterated point obtained from the CQ Near Points (604).

Step 1: Find the ApproximateValue

The ApproximateValue is the vector difference of the Near Point Iterate minus the axis values obtained from the HLVecCQ (567) of the parameter CQ Root Factor (237), as shown in FIG. 5.

Step 2: Find the TrueValue

The TrueValue is the value of the true root factor. The value is the difference between the Near Point Iterate, and the corresponding value RealPartInterval (226) from each axis of the Raw CQ Root Factor (526).

Step 3: Relative Precision Inequality

The following inequality is evaluated using the ApproximateValue and TrueValue from Steps 1 and 2.

CQInequality=MaxCQAbs[TrueValue−ApproximateValue]≦RPG*MinCQAbs[TrueValue]

Step 4: Test

Return failure, or false, when the above relative precision inequality fails; otherwise, continue to the next iteration of the points within the CQ Near Points (604) by assigning a new Near Point Iterate and looping back to Step 1. If there are no points remaining, then return success.

CQ Root Simplifier (590)

The CQ Root Simplifier (590) is shown center of the FIG. 12. This component finds the simplest form for the Raw CQ Root Factor (526) based on the CQ Tag Iterator (588) priority for attempting the removal of root parts. This component loops through all the iterates available in the CQ Tag Iterator (588); see center-left of FIG. 12. See Step 5, below, for exit conditions. Note that this component has parameters which supply the Raw CQ Root Factor (526) and the CQ Root Factor (205), as shown in FIG. 12. Here are the steps for evaluating each individual iterate:

Step 1: Find the CQ Near Points (604)

Call Get Near CQ (587) to find the CQ Near Points (604). This call need only be performed once, and the same value used for each iteration. In addition to the CQ Input Domain (582), this call requires the CQ Location (606). The CQ Location (606) specifies a position, either complex or quaternion, as the exact center of the root within a Raw CQ Root Factor (526). Thus, for each axis of the root, as a vector, it represents the ExactRealPart (225), as previously described.

Step 2: Temporary CQ Root Factor[HLVecCQ] (552)

A temporary CQ Root Factor[HLVecCQ] (552) is constructed by using first initializing the HLVecCQ (567) of the temporary to the HLVecCQ (567) of the parameter CQ Root Factor[HLVecCQ] (552), and then using the tags from current iteration of the CQ Tags (574) to zero any H and L values, as required by the tags.

Step 3: Construct a CQ Test (584)

The CQ Test (584), already described, is a data structure for holding all the parameters to test a specific root part removal using the CQ Factor Check (586). The required Raw CQ Root Factor (526) is simply the parameter Raw CQ Root Factor (526), unchanged. The required CQ Root Factor[HLVecCQ] (552) is the temporary CQ Root Factor[HLVecCQ] (552) constructed in Step 2. And finally, the required CQ Near Points (604) is set to the CQ Near Points (604) from Step 1.

Step 4: Call the CQ Factor Check (586)

The CQ Test (584) is passed as a parameter to the CQ Factor Check (586), which returns a Boolean (154) result.

Step 5: Check Boolean Result

If Step 4 is successful, then processing of the entire component is completed and the component exits by returning the temporary CQ Root Factor[HLVecCQ] (552) which was constructed in Step 2. If the current iterate of CQ Tags (574) indicates an empty list of tags, then the test should have passed; either this indicates a serious error or that more precision should be used in finding the Raw CQ Root Factor (526)! Otherwise, the next iterate for tags is found by calling the Conjugate Tag Iterator (301) and returning to Step 1 for more iteration.

Minimizing CQ Filter (572)

A detailed view of the Minimizing CQ Filter (572) is shown in FIG. 12, and implemented with the components just described. The action depends upon the input parameter, the Minimal CQ Factor (550), which can take on two forms; the two cases are now described.

CQ Lead Factor[VCQ] (522)

No simplification can be performed, and the component exits by returning CQ Lead Factor (522) as a Minimal CQ Factor (550).

CQ Root Factor[HLVecCQ] (552)

In this case, The CQ Root Factor [HLVecCQ], together with the parameter Raw CQ Factor (520), is processed by the CQ Root Simplifier (590). The result of this call is returned in the form of a Minimal CQ Factor (550).

Rational Poly Application

FIG. 13 shows a typical application of any of the previous embodiments, to create a rational polynomial of real, complex or quaternion numbers. The term rational polynomial refers to a the division of one polynomial, a numerator polynomial, by another, a denominator polynomial. In general, the resulting rational polynomial can be evaluated at any location of the input domain to produce a precise result with only round-off errors. In the following descriptions, "RCQ" stands for real, complex or quaternion.

Data Objects

RCQ Numerator (650), RCQ Denominator (652)

Polynomials for the numerator and denominator.

Numerator Form (656), Denominator Form (658)

These forms are the result of processing the RCQ Numerator (650) and RCQ Denominator (652) by a root product method (any of the earlier embodiments).

RCP Rational Target Form (662)

This form combines the two above forms into a rational polynomial.

Components

Rational Polynomial Generator (644)

A Rational Polynomial Generator (644) generates two polynomials, a numerator and a denominator polynomial, with one unknown, which can be real, complex, or quaternion (or hypercomplex) number. Here are two simple examples to illustrate some setup issues.

Curve Fitting

Polynomials are often used for curve fitting. As such, they attempt to approximate some curve or surface or data items. Traditionally, such polynomials, or rational polynomials, use a truncated power series polynomial form. If the traditional method is used, then the roots must be found; the roots will not be exact numbers, and the Polynomial Interface (100) must find those roots to some specified Target Precision. However, if the curve fitting is performed on a root product form using the actual root parts as variables, then the roots are to be interpreted as exact.

Pade Approximations

Polynomials can arise from solving equations related to matching derivatives, such as in Pade Approximations. Again, the embodiments of this document can be used to ensure correct results, even when traditional polynomial forms are used. However, instead of using traditional truncated power series, the root product form can be used to match derivatives, and this eliminates the process of root finding. Also, required relative precision for the coefficients for the Pade Approximation are known; for example, for root product forms, obtain the root values to at least (2P+2), where P is the Target Precision.

Precision Root Product Polynomial Setup (667)

The Precision Root Product Polynomial Setup (667) is any one of the earlier described embodiments capable of encoding th RCQ Numerator (650) and RCQ Denominator (652) into a Target Form (116). The resulting Target Forms (116)

are stored in a form which is easy to process, such as product list using Minimal Factors (237).

Rational Polynomial Encoder (664)

The Rational Polynomial Encoder (664) accepts two input polynomials and encodes the polynomials by calling the Precision Root Product Polynomial Setup (667), above. The Numerator Target Form (656) and the Denominator Target Form (658), are the result.

Quotient Coder (660)

The Quotient Coder (660) takes the Numerator Target Form (656) and the Denominator Target Form (658) and creates a new form, the RCP Rational Target Form (662), which combines the input polynomials into a rational polynomial. The leading factors of the numerator and denominator, for real and complex polynomials, can always be combined into a single leading factor.

Operation:

The method begins by a call to the Rational Polynomial Generator (654), which produces the input to the Rational Polynomial Encoder (664), which, in turn, executes and passes its output to the Quotient Coder (660), which executes, and stores its results as the RCP Rational Target Form (662), stored in the Memory Storage System (118).

SUMMARY, RAMIFICATIONS, BEST MODES

Summary

Floating point evaluations of polynomials no longer need to be subject to cancellation error, provided the computer resources are available for a one-time setup in this "Precise Root Product Polynomial Setup" invention. After setup, there is virtually no penalty in execution time or computer resources.

Ramifications

Time critical and precision critical computation finally can be achieved for polynomial evaluations. Without this invention, new functions could only be approximated quickly and precisely if some clever numerist figured out a clever trick to avoid cancellation error; even if successful, this could take days or weeks. Now, a few seconds of computer time can compute the simple computer instructions to achieve success. This can open up new applications of polynomials and reduce development time.

Precision Requirements for Roots, Feedback

Increasing the precision of the roots within the Polynomial Iterator (100) is useful in eliminating the special branch instruction for real polynomials. Unless a real or conjugate root is extremely close to an input floating point value, this increasing precision will work to eliminate the special branch. However, when the root approximation has hundreds of digits, the resulting L value (low order two-step word) can become very tiny and cause exponent out-of-range errors. For complex and quaternion systems, the program can always detect that insufficient precision is available, as seen in Step 5 of the CQ Root Simplifier (590). Increasing the precision is likely to eliminate the problem. If one truly needs to eliminate these problems, then increasing the root precision has no deleterious effects (except more setup time to find the higher precision roots). For example, the program will never use the extra precision during the encoding of the H and L parts, unless needed! Therefore, using extra precision is only an issue if out-of-range is an issue. However, to eliminate the extra cost of extra root precision, a feedback mechanism could be used. If the program detects relative precision failure for CQ Root Simplifier (590), then the entire encoding process could be repeated at higher and higher precision. This approach is particularly useful when the target environment has virtually unlimited exponent range.

Decreasing Round-Off Error

Some methods are described for further reducing round-off error.

High Precision Arithmetic

As described, the only time that "multiple precision" is required, is during a differencing operation of: $((x-rHigh)-rLow)$. This can be replaced when arbitrary length precision is available into the expression: $(x-r)$, where r is the full precision sum of $(rHigh+rLow)$. However, when high precision is not the best choice, is there a way to eliminate another round-off error? And is it worth it?

Extra Instructions and Processing

In the Jonathon Richard Skewchuk paper, referenced at the start, there is a description of a Two-Sum(x1,x2) adder. This routine is used in arbitrary precision arithmetic to add (or equivalently subtract) two floating point values in order to produce the rounded sum plus the exact rounding error. The routine uses 6 instructions and can be used when taking $(x-rHigh)$. Upon completion, the rLow is summed with the roundoff and as added to the $(x-rHigh)$ sum.

For example, suppose we wish to compute $((x-rHigh)-rLow)$. We first take rHighNeg and rLowNeg as the constants representing the negated rHigh and rLow values. Then, the following code sequence is executed (the first 6 instructions are equivalent to the Two Sum sequence):

```
highSum=x+rHighNeg;
rootHighVirtual=highSum-rHighNeg;
xLocVirtual=highSum-rootHighVirtual;
rootRoundOff=rHighNeg-rootHighVirtual;
xLocRoundOff=xLoc-xLocVirtual;
roundoff=(rootRoundOff+xLocRoundOff);
fullRoundoff=roundoff+rLowNeg;
resultFinal=highSum+fullRoundoff;
```

Scope of Invention

While the above description contains many specificities, these should not be construed as limitations on the scope of the invention, but rather as an exemplification of one preferred embodiment thereof. Many other variations are possible.

Accordingly, the scope of the invention should be determined not by the embodiment(s) illustrated, but by the appended claims and their legal equivalents.

I claim:

1. A machine executed method for translating polynomials, of one unknown, into alternative polynomial representations to eliminate cancellation errors when evaluating the alternative polynomial representations, comprising: within a constructor environment, preparing a target form for a target environment with a predetermined floating point number system, or target number system, wherein a number of mantissa bits of the target number system defines a target precision, wherein said target form defines a substitute polynomial throughout a predetermined input domain, defined within said target number system, wherein preparing the target form comprises:

(A) supplying a sequence of raw factors, wherein the combined product of raw factors represents a polynomial, including a raw lead factor of at least said target precision, and raw root factors, wherein all represented roots are at least twice said target precision based on relative precision with respect to the origin, (B) constructing a target form, and storing said target form in a memory storage system, based at least in part on an interface for accepting and processing a sequence of minimal factors, and by converting the incoming sequence of said minimal factors into said target form for use within said target environment, (C) converting a predetermined raw factor into a corresponding minimal factor, wherein rounding of values within said raw factors into said minimal factors, is the two step process of rounding each axis of each root into a high order, followed by rounding the difference of the axis value and said high order into a low order value, wherein the rounding is based on said target precision, and upon completion, returning said minimal factor, (D) creating said target form from the polynomial, at least in part by:
  (1) sequencing through all raw factors of said polynomial,
  (2) sequencing each of said raw factors with the following steps:
    (a) performing the step of converting using the raw factor of step (1), to produce a minimal factor,
    (b) calling said interface with the minimal factor produced in the previous step.

2. The method of claim 1, wherein the polynomial is a real polynomial, wherein said input domain, and hence the polynomial unknown, is limited to floating point numbers of said target precision, wherein said raw factors are supplied as a raw r factor form which includes a special value for each root factor, and pairs of roots forming a conjugate pair are combined into one raw factor for conjugates, wherein said minimal factor is a minimal r factor, and wherein said converting a predetermined raw factor into a corresponding minimal factor comprises converting the raw r factor, as input, to a minimal r factor, as output.

3. The method of claim 2, enhanced to filter unnecessary parts and factors, while preserving the target precision, by using a relative precision inequality to test removal, wherein the input and outputs of each filter of a filter set are minimal r factors, wherein root intervals and root location of the original raw factor are the basis of the true root values within the inequality, by further including:

(A) storing the filter set of at least one filter selected from a group consisting of:
  (1) an elimination r filter to convert a root factor as a minimal r factor, into a lead factor as a minimal r factor, wherein conversion occurs based on said relative precision inequality indicating true, when applied to the furthest point of said input domain, from the real part of the root factor,
  (2) a minimizing r filter to remove individual root parts of a minimal r factor, wherein conversion occurs based on said relative precision inequality indicating true, when applied to the nearest point of said input domain, from the real part of the root factor, excluding the special branch location, when present,
  (3) both filters (1) and (2), of the above choices, within said filter set, (B) calling each filter of said filter set, while passing outputs of a previous operation as inputs to a next operation, between the sequencing steps (D)(2)(a) and (D)(2)(b) of claim 1, so that input to the step (D)(2)(b) is from the last applied filter.

4. The method of claim 3, wherein said filter set is the elimination r filter of (A)(1), of claim 3.

5. The method of claim 3, wherein said filter set is the minimizing r filter of (A)(2), of claim 3.

6. The method of claim 3, wherein said filter set is the combination of the elimination r filter and minimizing r filter of (A)(3), of claim 3.

7. The method of claim 1, wherein the form of the polynomial is selected from a group consisting of complex polynomials, quaternions, and hypercomplex polynomials, wherein axes values of the input domain, and hence the axes values of the polynomial unknown, limited to floating point values of said target precision, wherein said raw factor is a raw cq factor, wherein said minimal factor is a minimal cq factor, and wherein said step of converting converts a raw cq factor to a minimal cq factor as output.

8. The method of claim 7, enhanced to filter away unnecessary parts and factors, while preserving the target precision by using a relative precision inequality to test removal, wherein the input and outputs of each filter are minimal cq factors, wherein root intervals and root location of the original raw factor are the basis of the true root values within the inequality, by further including:

(A) storing a cq filter set, of at least one filter selected from group consisting of:
  (1) an elimination cq filter to convert a root factor, as minimal cq factor, into a lead factor as a minimal cq factor, wherein conversion occurs based on said relative precision inequality indicating true, when applied to the furthest point of said input domain, by euclidean distance of the appropriate dimension, from the root, of the root factor,
  (2) a minimizing cq filter to remove individual root parts of a minimal cq factor, wherein removal occurs based on said relative precision inequality indicating true, when applied to the nearest point of said input domain, by euclidean distance of the appropriate dimension, from the root, of the root factor,
  (3) both filters (1) and (2) of the above choices within said cq filter set, (B) calling each filter of said cq filter set, while passing outputs of an operation as inputs to a next operation, between the sequencing steps (2)(a) and (2)(b) of said step of creating said target form from a polynomial, so that input to the step (2)(b) is from the last applied filter.

9. The method of claim 8, wherein said cq filter set, is the elimination cq filter of (A)(1), of claim 8.

10. The method of claim 8, wherein said cq filter set, is the minimizing cq filter of (A)(2), of claim 8.

11. The method of claim 8, wherein said qc filter set, is the combination of the elimination cq filter and minimizing cq filter of (A)(3), of claim 8.

12. The method of claim 1, further comprising finalizing the conversion and storage of said target form into said memory storage system.

13. The method of claim 1, wherein the sequence of raw factors is supplied by a polynomial iterator.

14. The method of claim 1, wherein evaluation of the substitute polynomial approximates, to said target precision, less rounding errors, a polynomial of finite degree in one unknown.

* * * * *